United States Patent
Endoh et al.

(10) Patent No.: US 9,812,709 B2
(45) Date of Patent: Nov. 7, 2017

(54) LITHIUM SECONDARY BATTERY, POSITIVE ELECTRODE ACTIVE MATERIAL, POSITIVE ELECTRODE, ELECTRIC TOOL, ELECTRIC VEHICLE, AND POWER STORAGE SYSTEM

(75) Inventors: Kazuaki Endoh, Fukushima (JP); Akira Takamuku, Fukushima (JP); Masaharu Senoue, Fukushima (JP); Guohua Li, Saitama (JP); Kenichi Kawase, Fukushima (JP); Yosuke Hosoya, Fukushima (JP)

(73) Assignee: SONY CORPORATION, Tokyo (JP)

( * ) Notice: Subject to any disclaimer, the term of this patent is extended or adjusted under 35 U.S.C. 154(b) by 1403 days.

(21) Appl. No.: 13/326,018

(22) Filed: Dec. 14, 2011

(65) Prior Publication Data
US 2012/0164525 A1  Jun. 28, 2012

(30) Foreign Application Priority Data

Dec. 28, 2010 (JP) ................. 2010-293268

(51) Int. Cl.
*H01M 4/52* (2010.01)
*H01M 4/525* (2010.01)
(Continued)

(52) U.S. Cl.
CPC ........... *H01M 4/525* (2013.01); *H01M 4/131* (2013.01); *H01M 4/366* (2013.01); *H01M 4/485* (2013.01);
(Continued)

(58) Field of Classification Search
None
See application file for complete search history.

(56) References Cited

U.S. PATENT DOCUMENTS 6,372,385 B1  4/2002 Kweon et al.
6,677,082 B2  1/2004 Thackeray et al.
(Continued)

FOREIGN PATENT DOCUMENTS

JP       3172388       3/2001
JP    2004-528691      9/2004
(Continued)

OTHER PUBLICATIONS

English Translation of JP 2007-257890.*

*Primary Examiner* — Daniel Gatewood
(74) *Attorney, Agent, or Firm* — Chip Law Group

(57) ABSTRACT

A lithium secondary battery includes a positive electrode, a negative electrode, and an electrolyte solution. The positive electrode contains a positive electrode active material including element M2 incorporated in a crystal structure in a surface layer area of a complex oxide, the oxide including the element M1 and being represented by the following formula (1), M2 being different from M1. The element M2 is at least one kind selected from the group consisting of magnesium Mg, calcium Ca, titanium Ti, zirconium Zr, sulfur S, fluorine F, iron Fe, copper Cu, boron B, aluminum Al, phosphorus P, carbon C, manganese Mn, nickel Ni, and cobalt Co.

$$Li_{1+a}(Mn_bCo_cNi_{1-b-c})_{1-a}M1_dO_{2-e} \quad (1)$$

M1 is at least one kind of aluminum, magnesium, zirconium, titanium, barium Ba, boron, silicon Si, and iron, a satisfies $0<a<0.25$, b satisfies $0.5 \leq b<0.7$, c satisfies $0 \leq c<1-b$, d satisfies $0.01 \leq d \leq 0.2$, and e satisfies $0 \leq e \leq 1$.

19 Claims, 4 Drawing Sheets

(51) Int. Cl.
  *H01M 4/485* (2010.01)
  *H01M 4/131* (2010.01)
  *H01M 10/0525* (2010.01)
  *H01M 4/36* (2006.01)

(52) U.S. Cl.
  CPC ........ *H01M 10/0525* (2013.01); *Y02E 60/122* (2013.01)

(56) References Cited

U.S. PATENT DOCUMENTS

| | | |
|---|---|---|
| 2003/0027048 A1 | 2/2003 | Lu et al. |
| 2003/0170540 A1 | 9/2003 | Ohzuku et al. |
| 2004/0053133 A1 | 3/2004 | Li |
| 2004/0234855 A1 | 11/2004 | Li |
| 2005/0136329 A1 | 6/2005 | Howard, Jr. et al. |
| 2007/0037043 A1 | 2/2007 | Chang et al. |
| 2007/0042269 A1 | 2/2007 | Chang et al. |
| 2007/0122703 A1 | 5/2007 | Whitfield et al. |
| 2007/0148546 A1 | 6/2007 | Shimizu et al. |
| 2007/0218359 A1 | 9/2007 | Shimizu et al. |
| 2007/0218360 A1 | 9/2007 | Tabuchi et al. |
| 2007/0292761 A1* | 12/2007 | Park .................. H01M 4/131 429/223 |
| 2008/0070122 A1 | 3/2008 | Park et al. |
| 2009/0011334 A1 | 1/2009 | Shizuka et al. |
| 2009/0011335 A1 | 1/2009 | Takeda et al. |
| 2009/0068561 A1 | 3/2009 | Sun et al. |
| 2009/0220859 A1 | 9/2009 | Yoon et al. |
| 2009/0220862 A1 | 9/2009 | Toyama et al. |
| 2010/0233542 A1 | 9/2010 | Endo et al. |
| 2010/0233543 A1 | 9/2010 | Numata et al. |
| 2012/0321911 A1* | 12/2012 | Watanabe .............. C01G 51/42 429/5 |

FOREIGN PATENT DOCUMENTS

| | | |
|---|---|---|
| JP | 2004-362934 | 12/2004 |
| JP | 3691279 | 6/2005 |
| JP | 2005-235628 | 9/2005 |
| JP | 2005310744 A * | 11/2005 |
| JP | 3873717 | 11/2006 |
| JP | 2007-503102 | 2/2007 |
| JP | 2007-516583 | 6/2007 |
| JP | 2007-200865 | 8/2007 |
| JP | 2007-220630 | 8/2007 |
| JP | 2007-242581 | 9/2007 |
| JP | 2007-335169 | 12/2007 |
| JP | 2008-047306 | 2/2008 |
| JP | 4080337 | 2/2008 |
| JP | 2008-063211 | 3/2008 |
| JP | 2008-078139 | 4/2008 |
| JP | 2008-091041 | 4/2008 |
| JP | 4106651 | 4/2008 |
| JP | 2008-127211 | 6/2008 |
| JP | 4219391 | 11/2008 |
| JP | 2008-300180 | 12/2008 |
| JP | 2009-004285 | 1/2009 |
| JP | 2009-009753 | 1/2009 |
| JP | 2009-503766 | 1/2009 |
| JP | 2009-505367 | 2/2009 |
| JP | 2009-123400 | 6/2009 |
| JP | 2009-152114 | 7/2009 |
| JP | 2009-158230 | 7/2009 |
| JP | 2009-158415 | 7/2009 |
| JP | 2009-525578 | 7/2009 |
| JP | 2009-179501 | 8/2009 |
| JP | 2009-206047 | 9/2009 |
| JP | 2009-206100 | 9/2009 |
| JP | 2009-218112 | 9/2009 |
| JP | 2009-259505 | 11/2009 |
| JP | 2009-274940 | 11/2009 |
| JP | 2010-009806 | 1/2010 |
| JP | 4432910 | 1/2010 |

* cited by examiner

LITHIUM SECONDARY BATTERY, POSITIVE ELECTRODE ACTIVE MATERIAL, POSITIVE ELECTRODE, ELECTRIC TOOL, ELECTRIC VEHICLE, AND POWER STORAGE SYSTEM

CROSS REFERENCES TO RELATED APPLICATIONS

The present application claims priority to Japanese Priority Patent Application JP 2010-293268 filed in the Japan Patent Office on Dec. 28, 2010, the entire content of which is hereby incorporated by reference.

BACKGROUND

The present disclosure relates to a positive electrode active material containing a complex oxide including lithium and a transition metal as a constituent element; a positive electrode and a lithium secondary battery using the positive electrode material; and an electric tool, an electric vehicle, and a power storage system using the lithium secondary battery.

Recently, small-size electronic apparatuses such as mobile terminal apparatuses have come into wide use, and there is strong requirement for to be small and light and to have high durability. Accordingly, a battery, particularly, a secondary battery capable of obtaining a high energy density with small size and light weight, as a power supply, is being developed. The secondary battery is not recently limited to the small-size electronic apparatuses, and application of the secondary battery to large-size electronic apparatuses such as vehicles is being studied.

As the secondary battery, it is widely proposed to use various kinds of charge and discharge phenomenon, but attention is being paid to a lithium secondary battery. The reason is because it is possible to obtain a higher energy density than a lead battery and a nickel-cadmium battery. The lithium secondary battery is a lithium ion secondary battery using absorption and discharge of lithium ions or a lithium metal secondary battery using precipitation and dissolution of lithium.

The lithium ion secondary battery has a positive electrode, a negative electrode, and an electrolyte solution, and the positive electrode and the negative electrode include a positive electrode active material and a negative electrode active material absorbing and discharging the lithium ions, respectively. The lithium metal secondary battery has the same configuration as the lithium ion secondary battery except that the negative electrode active material is lithium metal. As the positive electrode active material, a complex oxide including lithium and a transition metal as a constituent element is widely used, but the positive electrode active material directly related to a charge-discharge reaction has a great influence on battery performance, and thus various studies regarding composition of the complex oxide have been made.

Specifically, to improve characteristics of a charge-discharge cycle, it is proposed that a coating of a metal oxide is formed on a surface of a positive electrode including a positive electrode active material represented by $Li_xNi_{1-y}Co_yO_z$ ($0<x<1.3$, $0\leq y\leq 1$, and $1.8<z<2.2$) (for example, see Japanese Patent No. 3172388). The metal oxide is BeO, MgO, or the like.

To improve structural stability and thermal stability of the positive electrode active material, it is proposed that a metal oxide is coated on a surface of a positive electrode active material represented by $LiA_{1-x-y}B_xC_yO_2$ (A is Co or the like, B is Ni or the like, C is Al or the like, $0<x\leq 0.3$, and $0\leq y\leq 0.01$) (for example, see Japanese Patent No. 3691279). The metal oxide is an oxide such as Mg and Al.

To improve a cycle life and initial capacity, it is proposed that a surface of a spinel-type positive electrode active material represented by $Li_aMn_bM_cO_4$ (M is Mg or the like, $1.0\leq a\leq 1.15$, $1.8\leq b\leq 1.94$, $0.10\leq c\leq 0.10$ and $a+b+c=3$) is coated with an oxide including a metal element (for example, see Japanese Unexamined Patent Application Publication No. 2009-206047). The oxide including the metal element is an oxide such as Al and Co, and the metal element of the oxide forms a solid body with $Li_aMn_bM_cO_4$.

To improve capacity characteristics, life characteristics, and thermal stability, in a positive electrode active material including an internal bulk portion and an external bulk portion, it is proposed that a metal composition is provided by continuous concentration gradient from an interface between the internal bulk portion and the external bulk portion toward a surface of the active material (see Japanese Unexamined Patent Application Publication (Translation of PCT Application) No. 2009-525578). The internal bulk portion is $LiNi_{0.8}Co_{0.13}Mn_{0.07}O_2$ represented by $Li_aNi_{1-x-y-z}Co_xMn_yM_zO_{2-\delta}X\delta$ (M is Mg or the like, X is F or the like, $0.95\leq a\leq 1.2$, $0.01\leq x\leq 0.5$, $0.01\leq y\leq 0.5$, $0.005\leq z\leq 0.3$, and $0.05\leq x+y+z\leq 0.4$). The external bulk portion is $LiNi_{0.4}Co_{0.4}Mn_{0.2}O_2$ represented by $Li_aNi_{1-x-y-z}Co_xMn_yM_zO_{2-\delta}X\delta$ (M is Mg or the like, X is F or the like, $0.95\leq a\leq 1.2$, $0.01\leq x\leq 0.4$, $0.01\leq y\leq 0.5$, $0.002\leq z\leq 0.2$, and $0.4<x+y+z\leq 0.95$).

To sufficiently utilize high capacity characteristics of an Si-based or Sn-based negative electrode active material, it is proposed that a lithium-rich complex oxide $(Li_hMn_iCo_jNi_kO_2)$ is used as a positive electrode active material (see Japanese Unexamined Patent Application Publication No. 2009-158415), where $h=[3(1+x)+4a]/3(1+a)$, $i=[3\alpha(1+x)+2a]/3(1+a)$, $j=13(1-x)/(1+a)$, $k=\gamma(1-x)/(1+a)$, $0<a<1$, $\alpha>0$, $\beta>0$, $\gamma>0$, $\alpha+\beta+\gamma=1$, and $0\leq x<\frac{1}{3}$. The complex oxide is a solid solution represented by $Li_{1+x}(Mn\alpha Co\beta Ni\gamma)_{1-x}O_2 \cdot aLi_{4/3}Mn_{2/3}O_2$.

To improve battery capacity and charge-discharge cycle characteristics, it is provided that an oxide including Li, Ni, and the like is formed on a surface of a positive electrode active material represented by $Li_{1+w}Co_{1-x-y}Ga_xM_yO_{2-z}$ (M is Mg or the like, $-0.01\leq w\leq 0.01$, $0.0001<x<0.05$, $0\leq y<0.4$, and $-0.1\leq z\leq 0.2$) (for example, see Japanese Unexamined Patent Application Publication No. 2007-335169).

To obtain excellent cycle characteristics with high capacity and to prevent gas from occurring in a battery at the time of high temperature, it is proposed that a coating layer is provided on a surface of complex oxide particles including lithium and a transition metal (for example, see Japanese Unexamined Patent Application Publication No. 2009-054583). The coating layer includes at least one kind of elements M (different from the transition metal included in the complex oxide particles) selected from the second to the thirteenth groups, and at least one kind selected from the group consisting of elements X of phosphorus, silicon, and germanium, and the elements M and X represent different distribution in the coating layer.

SUMMARY

Recently, electronic apparatuses have gained higher performance and more functions and frequency of use has increased, and thus charge and discharge of a lithium secondary battery tends to be frequently repeated. Since circumstances of use of electronic apparatuses has tended to expand, the lithium secondary battery may be used under a strict condition such as high temperature circumstance. It is preferable to further improve battery performance such as battery capacity characteristics, cycle characteristics, preservation characteristics, and swell characteristics.

Particularly, recently, to further realize high capacity, there has been an expectation to use metal-based materials such as silicon, tin, and oxides thereof, instead of carbon materials such as graphite as negative electrode active materials. However, when the metal-based materials are used, irreversible capacity occurring in the negative electrode at the time of the first charging (the first cycle) increases, and thus the battery capacity characteristics, the cycle characteristics, and the like easily decrease at the time of the first and subsequent charging and discharging (the second and subsequent cycles). In addition, the metal-based materials greatly expand and contract at the time of charging and discharging as necessary, the metal-based materials are break down to cause an active surface, thus the electrolyte solution easily dissolves, and gas easily occurs in the battery. Even when the metal-based materials are used, it is necessary to secure the cycle characteristics with the high capacity.

It is desirable to provide a positive electrode active material, a positive electrode, a lithium secondary battery, an electric tool, an electric vehicle, and a power storage system, capable of obtaining excellent battery performance.

A positive electrode active material according to an embodiment of the present disclosure incorporates element M2 incorporated in a crystal structure in a surface layer area of a complex oxide, the oxide including the element M1 and being represented by the following formula (1), M2 being different from M1. The element M2 is at least one kind selected from the group consisting of magnesium Mg, calcium Ca, titanium Ti, zirconium Zr, sulfur S, fluorine F, iron Fe, copper Cu, boron B, aluminum Al, phosphorus P, carbon C, manganese Mn, nickel Ni, and cobalt Co.

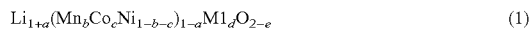

$$Li_{1+a}(Mn_bCo_cNi_{1-b-c})_{1-a}M1_dO_{2-e} \qquad (1)$$

where M1 is at least one kind selected from the group consisting of aluminum, magnesium, zirconium, titanium, barium Ba, boron, silicon Si, and iron, a satisfies $0<a<0.25$, b satisfies $0.5 \le b < 0.7$, c satisfies $0 \le c < 1-b$, d satisfies $0.01 \le d \le 0.2$, and e satisfies $0 \le e \le 1$.

A positive electrode according to another embodiment of the present disclosure includes the positive electrode active material. A lithium secondary battery of an embodiment of the present disclosure is provided with a positive electrode, a negative electrode, and an electrolyte solution, and the positive electrode includes the positive electrode active material. An electric tool, an electric vehicle, and a power storage system according to embodiments of the present disclosure use the lithium secondary battery.

The "surface layer area" means an outside part (a part surrounding a circumference of an inside part (a center part)) of a complex oxide, and specifically, is a part reaching a thickness (a depth) corresponding to 0.1% of a particle diameter (a median diameter) from the outermost surface of the complex oxide in a granular complex oxide. The outside part that is the "surface layer area" forms a crystal structure integral (continuous) with the inside part, and is not formed as a separate layer on the surface of the inside part.

"The element M2 is incorporated in the crystal structure in the surface layer area of the complex oxide" means that at least a part of constituent element of the complex oxide constituting the crystal structure is replaced by the element M2 in the crystal structure in the surface layer area of the complex oxide.

According to the positive electrode active material, the positive electrode, or the lithium secondary battery of the embodiments of the present disclosure, the element M2 (magnesium or the like) different from the element M1 in the crystal structure in the surface layer area is incorporated in the complex oxide including the element M1 (aluminum or the like) represented by the formula (1). In this case, when the lithium secondary battery using the positive electrode active material is charged with high charge voltage (for example, 4.4 V or higher) at the first time, a reaction of occurrence of irreversible capacity in the negative electrode is substantially completed, and thus it is possible to stably obtain the high battery capacity at the time of charging and discharging at the first and subsequent time. In addition, the center part of the positive electrode active material is protected from the electrolyte solution by the surface layer area at the time of charging and discharging, and the absorption and discharge of the lithium ions is not easily disturbed by the surface layer area. For this reason, even when the charging and discharging are repeated, the discharge capacity is not easily decreased, and gas (oxygen gas or the like) does not easily occur due to a dissolution reaction of the complex oxide. Accordingly, it is possible to obtain excellent battery performance in the battery capacity characteristics, cycle characteristics, preservation characteristics, and swell characteristics. In addition, it is possible to obtain the same effect even in the electric tool, the electric vehicle, and the power storage system using the lithium secondary battery described above.

Additional features and advantages are described herein, and will be apparent from the following Detailed Description and the figures.

DETAILED DESCRIPTION

Figure 1:
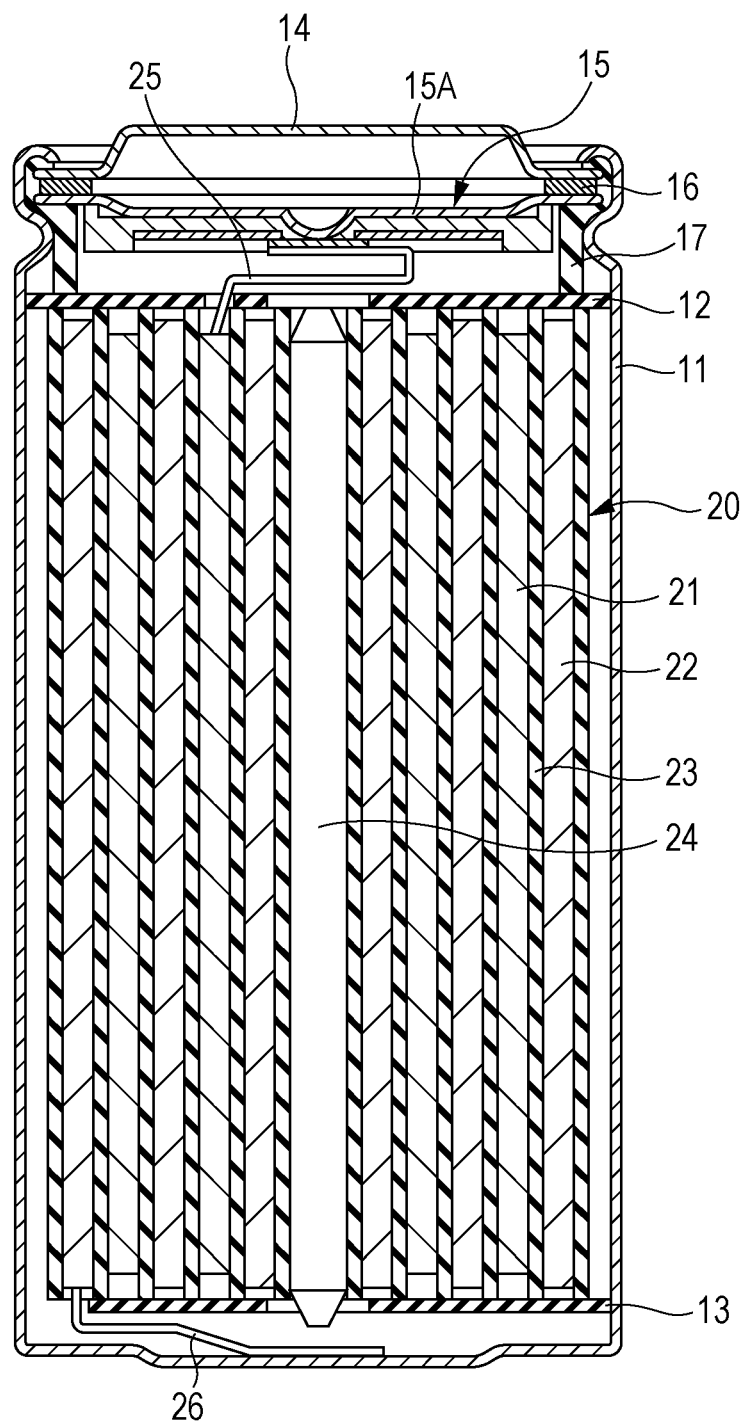
FIG. 1 is a cross-sectional view illustrating a configuration of a lithium ion secondary battery (cylindrical type) using a positive electrode active material of an embodiment of the present disclosure.

The present disclosure will be described in detail with reference to the drawings according to an embodiment. The order of the description is as follows.
1. Positive Electrode Active Material
2. Example of Application of Positive Electrode Active Material (Lithium Secondary Battery)
2-1. Positive Electrode and Lithium Ion Secondary Battery (Cylindrical Type)
2-2. Positive Electrode and Lithium Ion Secondary Battery (Laminated Film Type)
2-3. Positive Electrode and Lithium Metal Secondary Battery
3. Usage of Lithium Secondary Battery
1. Positive Electrode Active Material Configuration of Positive Electrode Active Material A positive electrode active material of an embodiment of the present disclosure is used in a positive electrode of, for example, a lithium secondary battery (hereinafter, merely referred to as "secondary battery") or the like.

In the positive electrode active material, an element M2 is incorporated in a crystal structure in a surface layer area of a complex oxide including the element M1 represented by the following formula (1), and M2 is different from M1. The element M2 is at least one kind selected from the group consisting of magnesium, calcium, titanium, zirconium, sulfur, fluorine, iron, copper, boron, aluminum, phosphorous, carbon, manganese, nickel, and cobalt.

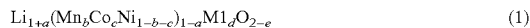
$$Li_{1+a}(Mn_bCo_cNi_{1-b-c})_{1-d}M1_dO_{2-e} \quad (1)$$

(M1 is at least one kind selected from the group consisting of aluminum, magnesium, zirconium, titanium, barium, boron, silicon, and iron, a satisfies 0<a<0.25, b satisfies 0.5≤b<0.7, c satisfies 0≤c<1−b, d satisfies 0.01≤d≤0.2, and e satisfies 0≤e≤1)

In the positive electrode active material, as described above, the element M2 different from the element M1 is incorporated only in the crystal structure in the surface layer area of the complex oxide in which lithium-rich MnCoNi-based complex oxide (hereinafter, merely referred to as "complex oxide") shown in the formula (1) is a base material. The "surface layer area" is an area at a predetermined distance from the outermost surface to the center of the complex oxide, and means an outside part (a part surrounding a circumference of an inside part (a center part)) of the complex oxide. Specifically, in a granular complex oxide, it is a part from the outermost surface of the complex oxide to a thickness (depth) corresponding to 0.1% of a particle diameter (median diameter). The outside part that is the "surface layer area" forms a crystal structure integral (continuous) with the inside part, and is not formed as a separate layer on the surface of the inside part.

In addition, "the element M2 is incorporated in the crystal structure in the surface layer area of the complex oxide" means that at least a part of constituent element of the complex oxide constituting the crystal structure is replaced by the element M2 in the crystal structure in the surface layer area of the complex oxide. In addition, the element M2 may be uniformly distributed in a direction from the center part to the outermost surface in the surface layer area, and may be distributed such that the content thereof gradually increases or decreases in the same direction.

Herein, the element M2 exists only in the crystal structure in the surface layer area of the complex oxide and the element M2 is incorporated only in the crystal structure in the surface layer area, since it is possible to obtain excellent battery performance at the time of charging and discharging of the secondary battery using the positive electrode active material.

Specifically, first, structural stability of the complex oxide is improved, resistance thereof is decreased, thus the positive electrode active material is not easily broken down and the discharge capacity is not easily decreased even when the charging and discharging are repeated. Accordingly, the battery capacity characteristics and the cycle characteristics are improved.

Second, the center part (a part which does not include the element M2) of the complex oxide is protected by the surface layer area including the element M2, and thus the center part is isolated from the electrolyte solution. In this case, even when the positive electrode is in a strong oxidation state in the charging state of the secondary batter, an electrolysis reaction of the electrolyte solution is suppressed, and an electrolysis reaction and an elution reaction of the complex oxide (center part) are also suppressed. For this reason, even when the charging and discharging are performed, the discharge capacity is not easily decreased, and gas (oxygen gas or the like) does not easily occur due a dissolution reaction of the complex oxide. Such an advantage is significant, particularly, when the charging and discharging are performed in a high temperature circumstance. Accordingly, the battery capacity characteristics, the cycle characteristics, the preservation characteristics, and the swell characteristics are improved.

Third, the absorption and discharge of the lithium ions in the complex oxide are not easily disturbed as compared with a case where a film of a compound (hereinafter, referred to as "M2-containing compound") including the element M2 is formed on the surface of the complex oxide and the surface of the complex oxide is coated with the M2-containing compound, and thus the discharge capacity is not easily decreased even when the charging and discharging are repeated. Such an advantage may be obtained even by the inactive coating disturbing movement of the lithium ions not being easily formed since the electrolysis reaction of the electrolyte solution is suppressed as described above. Accordingly, the battery capacity characteristics and the cycle characteristics are improved.

Fourth, since the element M2 is incorporated in the crystal structure of the complex oxide, the element M2 is not easily detached from the complex oxide even when the charging and discharging are repeated, as compared with a case where the element M2 is not incorporated in the crystal structure. The case where the element M2 is not incorporated in the crystal structure is a case where the surface of the complex oxide is coated with the M2-containing compound (the M2-containing compound is formed as a separate layer) as described above. Accordingly, even when the charging and discharging are repeated, it is possible to continuously obtain the series of advantages described above.

The reason why the base material of the positive electrode active material is the lithium-rich MnCoNi-based complex oxide shown in the formula (1) is because the reaction of occurrence of irreversible capacity in the negative electrode can be substantially completed at the first time of charging since a large amount of lithium is included as a constituent element.

Specifically, at the first time of charging and discharging of the secondary battery, the irreversible capacity occurs since the coating (SEI: Solid Electrolyte Interface film or the like) is formed on the surface of the negative electrode. Accordingly, the lithium ions discharged from the positive electrode active material at the first time of charging and discharging are consumed to cause the irreversible capacity. In this case, when the charge voltage at the first time of charging of the secondary battery is high voltage (for example, 4.4 V or higher), the sufficient amount of lithium ions are discharged from the positive electrode active material, and thus the lithium ions are consumed to cause the irreversible capacity in the negative electrode. Accordingly, the reaction of occurrence of the irreversible capacity is completed at the first time of charging and discharging. For this reason, at the time of charging and discharging at the first and subsequent time that is substantially the time of using the secondary battery, the lithium ions discharged from the positive electrode active material are consumed to cause the battery capacity. Accordingly, it is possible to stably obtain the high battery capacity at the time of charging and discharging at the first time and the later.

When the negative electrode active material of the negative electrode is a metal-based material including at least one of silicon and tin as a constituent element, or an oxide (for example, SiO or the like) thereof, the irreversible capacity may occur thereby. The lithium ions discharged from the positive electrode active material at the first time of charging easily and irreversibly react with the metal-based material or oxygen of the oxide thereof. The metal-based material described above is, for example, at least one kind selected from the group consisting of a single substance, alloy, and compound of silicon, and a single substance, alloy, and compound of tin, and the oxide of the metal-based material is, for example, a silicon oxide $SiO_v$ where $0.2<v<1.4$ or the like. The negative electrode active material may be the oxide of the metal-based material, and the irreversible capacity tends to increase.

The reason why the values of a to e shown in the formula (1) are in the range described above is as follows.

When a is 0, the absolute amount of the lithium ions is low, thus the reaction of occurrence of the irreversible capacity at the first time of charging may not be substantially completed, and it is difficult to stably obtain the high battery capacity at the time of charging and discharging at the first time and the later. When a is equal to or more than 0.25, the lithium ions are consumed to form a byproduct derived from lithium, and thus it is difficult to obtain sufficient battery capacity. When hydroxide is used as a lithium source to form the positive electrode active material, gas derived from the hydroxide occurs, and thus the secondary battery easily swells. In this case, $0.1<a<0.25$ is preferable. It is possible to obtain a greater effect.

When b is less than 0.5, the absolute amount of manganese is low, and the complex oxide may not include the sufficient amount of lithium as the constituent element. Accordingly, the reaction of occurrence of the irreversible capacity may not be substantially completed at the first time of charging, and it is difficult to stably obtain the high battery capacity at the time of charging and discharging at the first time and the later. Meanwhile, when b is equal to or more than 0.7, lithium manganate ($Li_2MnO_4$) which does not contribute to the battery capacity is formed, and thus the battery capacity decreases.

When c is equal to or more than 1−b (=0.7), the absolute amount of nickel is too decreased relative to the absolute amount of cobalt, and thus it is difficult to obtain the sufficient battery capacity.

When d is less than 0.01, the absolute amount of the element M1 is too small, and thus the surface layer area does not exhibit a sufficient protective function. Meanwhile, when d is more than 0.2, it is difficult to stably obtain the lithium-rich MnCoNi-based complex oxide from a valence compensation face, a crystalline property of the complex oxide is also decreased, and thus it is difficult to obtain the sufficient battery capacity.

When e is more than 1, it is difficult to stably obtain the lithium-rich MnCoNi-based complex oxide from the valence compensation face, and thus it is difficult to obtain the sufficient battery capacity.

The element M1 shown in the formula (1) including one or more kinds of the element group described above is not particularly limited, but aluminum, magnesium, or titanium is preferable, and aluminum is more preferable. The reason is because it is possible to obtain a greater effect. The element M2 including one or more kinds of the element group described above is not particularly limited, but magnesium, sulfur, fluorine, aluminum, phosphorus, carbon, or nickel is preferable, magnesium or carbon is more preferable, and magnesium is even more preferable. The reason is because it is possible to obtain a greater effect.

The content of the element M2 in the positive electrode active material (complex oxide) is not particularly limited, but it is preferable that the content of lithium be sufficiently small. When the content of the element M2 existing in the surface layer area of the complex oxide is too large, the absorption and discharge of the lithium ions may be disturbed. The reason is because the battery capacity may be decreased. It is preferable that the content of the element M2 is 0.01 mol % to 5 mol % with respect to the content of lithium in the complex oxide. The reason is because it is possible to obtain the sufficient battery capacity while keeping the protective function based on the surface layer area.

The positive electrode active material is burned after the element M2 is deposited on the surface of the complex oxide by a mechanochemical reaction, for example, using the complex oxide and the M2-containing compound. In this case, it is preferable that the M2-containing compound form a complex oxide and a solid solution. It is preferable that the element M2 is replaced by a part of lithium excessively (lithium-rich) existing in the crystal structure in the surface layer area of the complex oxide. The reason is because it is possible to obtain a greater effect. However, the element M2 may be replaced by the other element other than lithium. The kind of the M2-containing compound is not particularly limited, but is, for example, an oxide including the element M2, a hydroxide, or a phosphoric oxide.

Method of Analyzing Positive Electrode Active Material

To confirm that the positive electrode active material has the configuration described above, it is preferable to analyze the positive electrode active material using various element analyzing methods. The element analyzing method is, for example, an X-ray diffraction (XRD) method, a time off flight secondary ion mass spectrometry (TOF-SIMS) method, a high frequency inductively coupled plasma (ICP) light emission spectrum analyzing method, a Raman spectrum analyzing method, or energy dispersive X-ray spectrometry (EDX). In this case, the analysis may be performed after the surface layer area of the complex oxide is dissolved by acid.

Particularly, since the element M2 is incorporated in the crystal structure of the complex oxide, it is preferable to use the XRD method such that the element M2 from a part of the crystal structure or the range of existence of the element M2 in the complex oxide is inspected.

In an area (an area where the positive electrode and the negative electrode are opposed) where the charging and discharging are performed on the secondary battery, the crystal structure of the complex oxide is changed by the charging and discharging, and thus the crystal structure may not be confirmed after the charging and discharging by the X-ray diffraction method. However, when an area (a non-charging/discharging area) where the charging and discharging are not performed on the positive electrode exists, it is preferable to analyze the positive electrode active material in the area. In the non-charging/discharging area, the crystal structure of the complex oxide before the charging and discharging is kept, and it is possible to analyze the configuration of the positive electrode active material irrespective of the charging and discharging. The "non-charging/discharging area" is an area where the charging and discharging can be performed between the positive electrode and the negative electrode caused by the existence of an insulating protective tape since the insulating protective tape can be attached to the surface of the end portion of the positive electrode (a positive electrode active material layer), for example, to secure stability.

To inspect the content of the element M2 in the positive electrode active material, it is preferable to analyze the positive electrode active material using, for example, an ICP light emission spectrum analyzing method, a TOF-SIMS method, or an EDX method. Even in this case, it is preferable to analyze the non-charging/discharging area of the positive electrode.

For example, the sequence of using the ICP light emission spectroscopy is as follows. First, a buffering solution is added to and stirred with particles of the positive electrode active material. Subsequently, the buffering solution, in which the surface of the particles of the positive electrode active material is dissolved, is extracted for each predetermined time and filtered using a filter. Subsequently, mass of lithium and element M2 in the buffering solution extracted for each time is measured by the ICP light emission spectrum analyzing method. Lastly, molar mass (mol) of lithium and element M2 is calculated from the measured mass, and a molar ratio (mol %) of the element M2 to lithium is acquired.

Method of Using Positive Electrode Active Material

When the secondary battery using the positive electrode active material is charged and discharged, it is preferable that the charge voltage (positive electrode potential: standard potential with respect to lithium metal) at the first time of charging be a high voltage, specifically, 4.4 V or higher. A sufficient amount of lithium ions is emitted from the positive electrode active material at the first time of charging, and thus the reaction of occurrence of the irreversible capacity in the negative electrode can be substantially completed. However, to suppress the dissolution reaction of the complex oxide, it is preferable that the charge voltage at the first time of charging be not too drastically high, specifically, 4.6 V or lower.

In addition, the charge voltage (positive electrode potential: standard potential with respect to lithium metal) at the first time of charging and the later is not particularly limited, but it is preferable that it be lower than the charge voltage at the first time of charging, specifically, about 4.3 V. To obtain the battery capacity, the lithium ions are smoothly discharged from the positive electrode active material, and the electrolysis reaction of the electrolyte solution and the dissolution reaction of the separator are suppressed.

Operation and Effect of Positive Electrode Active Material

According to the positive electrode active material, the element M2 (magnesium or the like) different from the element M1 is incorporated in the crystal structure in the surface layer area of the complex oxide including the element M1 (aluminum or the like) shown in the formula (1). In this case, when the lithium ion secondary battery using the positive electrode active material is charged with high charge voltage (for example, 4.4 V or higher) at the first time, the reaction of occurrence of the irreversible capacity in the negative electrode is substantially completed, and thus it is possible to stably obtain the high battery capacity at the time of charging and discharging at the first time and the later. The center part of the complex oxide at the time of charging and discharging is protected from the electrolyte solution by the surface layer area (outside part), and the absorption and discharge of lithium ions are not disturbed by the surface layer area. Accordingly, even when the charging and discharging are repeated, the discharge capacity is not easily decreased and the gas (oxygen gas or the like) does not easily occur by the dissolution reaction of the complex oxide. Accordingly, it is possible to obtain the excellent battery performance in the battery capacity characteristics, the cycle characteristics, the preservation characteristics, and the swell characteristics.

2. Example of Application of Positive Electrode Active Material (Lithium Secondary Battery)

Next, an example of application of the positive electrode active material will be described. The positive electrode active material is used, for example, in the positive electrode of the lithium secondary battery.

2-1. Positive Electrode and Lithium Ion secondary Battery (Cylindrical Type)

Figure 2:
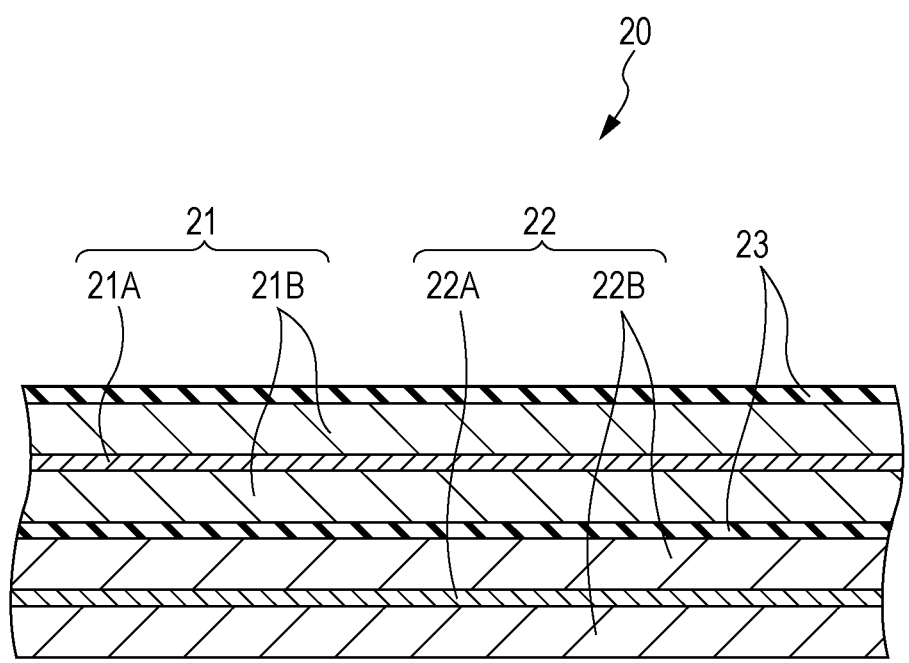
FIG. 2 is a cross-sectional view illustrating an enlarged part of a winding electrode body shown in FIG. 1.

FIG. 1 and FIG. 2 show a cross-sectional configuration of a cylindrical type lithium ion secondary battery as an example of the secondary battery. In FIG. 2, a part of a winding electrode body 20 shown in FIG. 1 is enlarged.

Overall Configuration of Secondary Battery

In the secondary battery, mainly, the winding electrode body 20 and a pair of insulating plates 12 and 13 are housed in a hollow cylindrical battery can 11. The winding electrode body 20 is a winding electrode body in which the positive electrode 21 and the negative electrode 22 are laminated and wound through the separator 23.

The battery can 11 has a hollow structure in which one end is closed and the other end is opened, and is formed by, for example, iron, aluminum, or alloy thereof. In addition, when the battery can 11 is formed of iron, the surface of the battery can 11 may be coated with nickel or the like. The pair of insulating plates 12 and 13 are disposed to extend perpendicularly to the winding circumferential face with the winding electrode body 20 interposed up and down therebetween.

A battery cap 14, a safety valve mechanism 15, and a thermal resistance element (Positive Temperature Coefficient: PTC element) 16 are caulked at the opened end portion of the battery can 11 through a gasket 17. Accordingly, the battery can 11 is sealed. The battery cap 14 is formed of, for example, the same material as the battery can 11. The safety valve mechanism 15 and the thermal resistance element 16 is provided in the battery cap 14, and the safety valve mechanism 15 is electrically connected to the battery cap 14 through the thermal resistance element 16. In the safety valve mechanism 15, when internal pressure is equal to or higher than a predetermined value due to an internal short circuit or heating from the outside, a disk plate 15A is reversed to cut off the electrical connection between the battery cap 14 and the winding electrode body 20. The thermal resistance element 16 prevents abnormal heat generation caused by a large current by the increase of resistance corresponding to the increase of temperature. The gasket 17 is formed of, for example, an insulating material, and asphalt may be applied to the surface thereof.

A center pin 24 may be inserted into the center of the winding electrode body 20. The positive electrode 21 is connected to a positive electrode lead 25 formed of a conductive material such as aluminum, and the negative electrode 22 is connected to a negative electrode lead 26 formed of a conductive material such as nickel. The positive electrode lead 25 is welded into the safety valve mechanism 15 and is electrically connected to the battery cap 14, and the negative electrode lead 26 is welded into the battery cap 11 and is electrically connected thereto.

Positive Electrode

In the positive electrode 21, a positive electrode active material layer 21B is provided on one face or both faces of, for example, a positive electrode collection body 21A. The positive electrode collection body 21A is formed of, for example, a conductive material such as aluminum, nickel, and stainless steel. The positive electrode active material layer 21B includes the positive electrode active material described above, and may include the other material such as a positive electrode coupling agent and a positive conductive agent as necessary.

The positive coupling agent is any one or more kinds of, for example, synthetic rubber and polymer material. The synthetic rubber is, for example, styrene-butadiene-based rubber, fluorine-based rubber, or ethylene-propylene-diene. The polymer material is, for example, polyvinylidene fluoride or polyimide.

The positive electrode conductive agent is, for example, any one or more kinds such as carbon materials. The carbon material is, for example, graphite, carbon black, acetylene black, or ketjen black. In addition, the positive electrode conductive agent may be a metal material or conductive polymer as long as it is a conductive material.

Negative Electrode

In the negative electrode 22, a negative electrode active material layer 22B is provided on one face or both faces of, for example, a negative electrode collection body 22A.

The negative electrode collection body 22A is formed of, for example, a conductive material such as copper, nickel, and stainless steel. It is preferable that the surface of the negative electrode collection body 22A is roughened. The reason is because the adhesion of the negative electrode active material layer 22B to the negative electrode collection body 22A is improved by a so-called anchor effect. In this case, in an area opposed to at least the negative electrode active material layer 22B, it is preferable that the surface of the negative electrode collection body 22A be roughened. A method of roughening may be, for example, a method of forming corpuscles by an electrolysis process. The electrolysis process is a method of forming the corpuscles on the surface of the negative electrode collection body 22A to provide unevenness in an electrolysis vessel by an electrolysis method. A copper foil produced by the electrolysis method is generally called an electrolysis copper foil.

The negative electrode active material layer 22B includes any one or more kinds of negative electrode materials capable of absorbing and discharging the lithium ions, as the negative electrode active material, and may include the other material such as a negative electrode coupling agent and a negative conductive agent as necessary. In addition, details of the negative coupling agent and the negative conductive agent are, for example, the same as the positive electrode coupling agent and the positive electrode conductive agent, respectively. In the negative electrode active material layer 22B, for example, it is preferable that the charge capacity of the negative electrode material be larger than the discharge capacity of the positive electrode 21 to prevent lithium metal from being unintentionally precipitated at the time of charging and discharging.

The negative electrode material is, for example, a carbon material. Since the change of the crystal structure at the time of absorbing and discharging the lithium ions is very small, it is possible to obtain the high energy density and excellent cycle characteristics. Additionally, it is able to act as a negative electrode conductive agent. The carbon material is, for example, light graphitizable carbon, non-graphitizable carbon in which a face distance of a (002) face is equal to or more than 0.37 nm, or graphite in which a face distance of a (002) face is equal to or less than 0.34 nm. More specifically, the carbon material is pyrolytic carbons, cokes, glass carbon fibers, organic polymer compound calcination bodies, carbon blacks, or the like. The cokes include pitch cokes, needle cokes, oil cokes, and the like. The organic polymer compound calcination bodies may be phenol, and the carbon material may be low crystalline carbon subjected to a heat treatment of about 1000° C. or lower, or amorphous carbon. It is obtained by baking resin or furan resin at a proper temperature to be carbon. The carbon material may be low crystalline carbon subjected to a heat treatment of about 1000° C. or lower, or amorphous carbon. The form of carbon materials may be any of a fiber shape, a spherical shape, a granular shape, or a scale shape.

The negative electrode material is, for example, a material (metal-based material) including any one or more kinds of metal element and semi-metal element, as a constituent element. The reason is because it is possible to obtain high energy density. The metal-based material may be a single substance of metal element or semi-metal element, alloys, compounds, two or more kinds thereof, and may include one or more kinds of phases in at least a part thereof. In addition, the alloy of the present disclosure includes a material including one or more kinds of metal element and one or more kinds of semi-metal element in addition to the material formed of two or more kinds of metal element. The alloy may include nonmetal element. The structure includes a solid solution, an eutectic (eutectic mixture), an intermetal compound, or a coexisting material of two or more kinds thereof.

The metal element or semi-metal element are, for example, metal element or semi-metal element which can form alloy with lithium, specifically, one or more kinds of the following elements. It is magnesium, boron, aluminum, gallium, indium, silicon, germanium Ge, tin, or lead Pb. It is bismuth Bi, cadmium Cd, silver Ag, zinc, hafnium Hf, zirconium, yttrium, palladium Pd, or platinum Pt. At least one of silicon and tin is preferable. Since it is excellent in capability for absorbing and discharging lithium ions, it is possible to obtain high energy density.

The material including at least one of silicon and tin may be a single substance of silicon or tin, alloy, or compound, two or more kinds thereof, and may include one or more kinds of phases in at least a part thereof. The single substance is a single substance (may include a small amount of impurities) from the general reason, and does not mean a purity of 100%.

The silicon alloy is, for example, a material including one or more kinds of the following elements as a constituent element other than silicon. It is tin, nickel, copper, iron, cobalt, manganese, zinc, indium, silver, titanium, germanium, bismuth, antimony, or chromium. The silicon compound may be an alloy including, for example, oxygen or carbon as a constituent element other than silicon. The silicon compound may include, for example, any one or more of elements described with respect to the alloy of silicon, as a constituent element other than silicon.

The alloy or compound of silicon may be, for example, the following material. It is $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$ or $TaSi_2$. It is $VSi_2$, $WSi_2$, $ZnSi_2$, $SiC$, $Si_3N_4$, $Si_2N_2O$, $SiO_v$ ($0<v\leq2$) or LiSiO. In $SiO_v$, v is $0.2<v<1.4$.

The alloy of tin is, for example, a material including one or more kinds of the following elements, as a constituent element other than tin. It is silicon, nickel, copper, iron, cobalt, manganese, zinc, indium, silver, titanium, germanium, bismuth, antimony, or chromium. The compound of tin may be, for example, a material including oxygen or carbon as a constituent element. The compound of tin may include, for example, any one or more of elements described with respect to the alloy of tin, as a constituent element other than tin. The alloy or compound of tin may be, for example, $SnO_w$ ($0<w\le2$), $SnSiO_3$, LiSnO, or $Mg_2Sn$.

The material including tin may be preferably a material including tin as the first constituent element, and the second and third constituent elements. The second constituent element is, for example, one or more kinds of the following elements. It is cobalt, iron, magnesium, titanium, vanadium, chromium, manganese, nickel, copper, zinc, gallium, or zirconium. It is niobium, molybdenum, silver, indium, cerium, hafnium, tantalum, tungsten, bismuth, or silicon. The third constituent element is, for example, one or more kinds of boron, carbon, aluminum, and phosphorus. When including the second and third elements, it is possible to obtain high battery capacity and excellent cycle characteristics.

A material (SnCoC-containing material) including tin, cobalt, and carbon is preferable. As the composition of the SnCoC-containing material, for example, the content of carbon is 9.9 mass % to 29.7 mass %, and a ratio (Co/(Sn+Co)) of the contents of tin and cobalt is 20 mass % to 70 mass %. In such a composition range, it is possible to obtain high energy density.

The SnCoC-containing material has a phase including tin, cobalt, and carbon, and the phase is preferably low crystalline or amorphous. The phase is a reaction phase which can react with lithium, and it is possible to obtain excellent characteristics by existence of the reaction phase. A half value width of a diffraction peak obtained by X-ray diffraction of the phase is preferably 1.0° or more at a diffraction angle 2θ when CuKα ray is used as specific X ray and an insertion rate is 1°/min. The lithium ions are further smoothly absorbed and discharged, and a reaction property to the electrolyte solution is decreased. The SnCoC-containing material may include a phase including a single substance or a part of constituent element in addition to a low crystalline or amorphous phase.

It is possible to easily determine whether or not the diffraction peak obtained by the X-ray diffraction corresponds to the reaction phase capable of reacting with lithium by comparing an X-ray diffraction chart before and after an electrochemical reaction to lithium. For example, when the position of the diffraction peak is changed before and after the electrochemical reaction to lithium, it corresponds to the reaction phase capable of reacting with lithium. In this case, for example, the diffraction peak of the low crystalline or amorphous reaction phase is in the range of 2θ=20° to 50°. Such a reaction phase includes, for example, the constituent element described above, and it is mainly considered that it is low crystalline or amorphous by existence of carbon.

In the SnCoC-containing material, it is preferable that at least a part of carbon that is the constituent element be coupled with metal element or semi-metal element that are the other constituent element. The reason is because cohesion or crystallization of tin or the like is suppressed. The coupling state of element can be confirmed by, for example, X-ray photoelectron spectroscopy (XPS). In a device available on the market, for example, Al—Kα rays, Mg—Kα rays, or the like is used as soft X-rays. When at least a part of carbon is coupled with metal element or semi-metal element, a peak of a synthetic wave of the is orbital (C1s) of carbon is represented in an area lower than 284.5 eV. Energy is calibrated to obtain a peak of 4f orbital (Au4f) of gold element at 84.0 eV. In this case, generally, since surface contamination carbon exists on the surface of substances, the peak of C1s of the surface contamination carbon is 284.8 eV, which is energy standard. In the XPS measurement, a waveform of the peak of C1s is obtained in a form including the peak of the surface contamination carbon and the peak of carbon of the SnCoC-containing material, and thus analysis is performed using, for example, software available on the market to separate peaks therebetween. In the analysis of waveforms, the position of the main peak existing on the minimum restriction energy side is energy standard (284.8 eV).

In addition, the SnCoC-containing material may further include the other constituent element as necessary. The constituent element may be one or more kinds of silicon, iron, nickel, chromium, indium, niobium, germanium, titanium, molybdenum, aluminum, phosphorus, gallium, and bismuth.

A material (SnCoFeC-containing material) including tin, cobalt, iron, and carbon in addition to the SnCoC-containing material is preferable. The composition of the SnCoFeC-containing composition may be arbitrarily set. For example, the composition when the content of iron is set lower is as follows. The content of carbon is 9.9 mass % to 29.7 mass %, the content of iron is 0.3 mass % to 5.9 mass %, and a ratio (Co/(Sn+Co)) of the contents of tin and cobalt is 30 mass % to 70 mass %. For example, the composition when the content of iron is set higher is as follows. The content of carbon is 11.9 mass % to 29.7 mass %. A ratio ((Co+Fe)/(Sn+Co+Fe)) of the contents of tin, cobalt, and iron is 26.4 mass % to 48.5 mass %, and a ratio (Co/(Co+Fe)) of the contents of cobalt and iron is 9.9 mass % to 79.5 mass %. In such a composition range, it is possible to obtain high energy density. A property of matter (a half value width or the like) of the SnCoFeC-containing material is the same as the SnCoC-containing material described above.

The other negative electrode material is, for example, metal oxide, polymer compound, or the like. The metal oxide is, for example, iron oxide, ruthenium oxide, molybdenum oxide, or the like. The polymer compound is, for example, polyacetylene, polyaniline, polypyrrole, or the like.

The negative electrode active material layer 22B is formed by, for example, a coating method, a gas phase method, a liquid phase method, a spraying method, a calcination method (sintering method), or two or more kinds of the methods. The coating method is, for example, a method of mixing granular negative electrode active materials with a coupling agent or the like, then dispersing it in a solvent such as an organic solvent, and coating it. The gas phase method may be, for example, a physical deposition method or a chemical deposition method. Specifically, it may be a vacuum deposition method, a sputtering method, an ion plating method, a laser ablation method, a thermochemical vapor deposition method, a chemical vapor deposition (CVD) method, a plasma chemical vapor deposition method, or the like. The liquid phase method may be, for example, an electrolysis plating method, a non-electrolysis plating method, or the like. The spraying method is a method of spraying the negative electrode active material in a dissolved state or a semi-dissolved state. The calcination method is, for example, a method of performing coating in the same order as that of the coating method then performing a heat treatment at a temperature higher than a melting point of the coupling agent or the like. In the calcination method, the method of the related art may be used. As an example, it may be, for example, an atmospheric calcination method, a reaction calcination method, a hot press calcination method, or the like.

Separator

The separator 23 separates the positive electrode 21 and the negative electrode 22, and allows lithium ions to pass while preventing the short circuit of current caused by contact of both electrodes. In the separator 23, an electrolyte solution that is a liquid electrolyte (electrolyte solution) is impregnated. The separator 23 is configured by, for example, a porous film formed of synthetic resin or ceramic, and by laminating two or more kinds of porous films thereof. The synthetic resin is, for example, polytetrafluoroethylene, polypropylene, polyethylene, or the like.

Electrolyte Solution

The electrolyte solution includes a solvent, and an electrolyte salt dissolved therein.

The solvent is, for example, any one or more kinds of non-aqueous solvents (organic solvents) described hereinafter. It is ethylene carbonate, propylene carbonate, butylene carbonate, dimethyl carbonate, diethyl carbonate, ethylmethyl carbonate, methylpropyl carbonate, γ-butyrolactone, γ-valerolactone, 1,2-dimethoxyethane, or tetrahydrofuran. It is 2-methyltetrahydrofuran, tetrahydropyran, 1,3-dioxolane, 4-methyl-1,3-dioxolane, 1,3-dioxane, or 1,4-dioxane. It is methyl acetate, ethyl acetate, methyl propionate, ethyl propionate, methyl butyrate, methyl isobutyrate, trimethyl methyl acetate, or trimethyl ethyl acetate. It is acetonitrile, glutaronitrile, adiponitrile, methoxyacetonitrile, 3-methoxypropionylnitrile, N,N-dimethylformamide, N-methylpyrrolidinone, or N-methyloxazolidinone, N,N'-dimethylimidazolidinone, nitromethane, nitroethane, sulfolane, trimethyl phosphate, or dimethylsulfoxide. The reason is because it is possible to obtain excellent battery capacity, cycle characteristics, preservation characteristics, and the like.

At least one kind selected from the group consisting of ethylene carbonate, propylene carbonate, dimethyl carbonate, diethyl carbonate, and ethylmethyl carbonate is preferable. The reason is because it is possible to obtain more excellent characteristics. In this case, combination of a high viscosity (high permittivity) solvent (for example, specific permittivity δ≥30) such as ethylene carbonate and propylene carbonate, and a low viscosity solvent (for example, viscosity≤1 mPa·s) such as dimethyl carbonate, ethylmethyl carbonate, and diethyl carbonate is more preferable. The reason is because a dissociation property of electrolyte salt and mobility of ions are improved.

Particularly, the solvent may be a cyclic ester carbonate (unsaturated carbon bond cyclic ester carbonate) having one or more of unsaturated carbon bonds. Since a stable protective film is formed on the surface of the negative electrode 22 at the time of charging and discharging, the electrolysis reaction of the electrolyte solution is suppressed. The unsaturated carbon bond cyclic ester carbonate is, for example, vinylene carbonate, vinylethylene carbonate, or the like. The content of unsaturated carbon bond cyclic ester carbonate in the non-aqueous solvent is, for example, equal to or more than 0.01 weight % and equal to or less than 10 weight %. The reason is because the electrolysis reaction of the electrolyte solution is suppressed without decreasing the battery capacity too much.

The solvent may be at least one kind selected from the group consisting of a chained ester carbonate (halogenated chained ester carbonate) having one or more halogen groups, and a cyclic ester carbonate (halogenated cyclic ester carbonate) having one or more halogen groups. Since a stable protective film is formed on the surface of the negative electrode 22 at the time of charging and discharging, the electrolysis reaction of the electrolyte solution is suppressed. The kinds of halogen groups are not particularly limited, but a fluorine group, a chlorine group, or a bromine group is preferable, and the fluorine group is more preferable. The reason is because it is possible to obtain the high effect. However, the number of halogen groups is more preferably two than one, and may be three or more. Since a stronger and stable protective film is formed, the electrolysis reaction of the electrolyte solution is further suppressed. The halogenated chained ester carbonate is, for example, fluoromethylmethyl carbonate, bismuth carbonate (fluoromethyl), difluoromethylmethyl carbonate, or the like. The halogenated cyclic ester carbonate is 4-fluoro-1,3-dioxolan-2-one, 4,5-difluoro-1,3-dioxolan-2-one, or the like. The contents of halogenated chained ester carbonate and halogenated cyclic ester carbonate in the non-aqueous solvent are, for example, equal to or more 0.01 weight % and equal to or less than 50 weight %. The reason is because the electrolysis reaction of the electrolyte solution is suppressed without decreasing the battery capacity too much.

The solvent may be a sultone (cyclic sulfonate ester). The reason is because chemical stability of the electrolyte solution is improved. The sultone is propane sultone, propene sultone, or the like. The content of sultone in the non-aqueous solvent is, for example, equal to or more than 0.5 weight % and equal to or less than 5 weight %. The reason is because the electrolysis reaction of the electrolyte solution is suppressed without decreasing the battery capacity too much.

The solvent may be an acid anhydride. The reason is because chemical stability of the electrolyte solution is improved. The acid anhydride is, for example, dicarboxylic acid anhydride, disulfonic acid anhydride, sulfocarboxylic acid anhydride, or the like. The dicarboxylic acid anhydride is, for example, succinic anhydride, glutaric acid anhydride, maleic acid anhydride, or the like. The disulfonic acid anhydride is, for example, ethanedisulfonate anhydride, propanesulfonic acid anhydride, or the like. The sulfocarboxylic acid anhydride is, for example, sulfobenzoic acid anhydride, sulfopropionic acid anhydride, sulfobutyric acid anhydride, or the like. The content of acid anhydride in the non-aqueous solvent is, for example, equal to or more than 0.5 weight % and equal to or less than 5 weight %. The reason is because the electrolysis reaction of the electrolyte solution is suppressed without decreasing the battery capacity too much.

Electrolyte Salt

The electrolyte salt is, for example, any one or more kinds of lithium salts described hereinafter. However, the electrolyte salt may be the other salt (for example, light metal salt other than the lithium salt) other than the lithium salt.

The lithium salt is, for example, the following compound or the like. It is lithium hexafluorophosphate ($LiPF_6$), lithium tetrafluoborate ($LiBF_4$), lithium perchlorate ($LiClO_4$), lithium hexafluoroarsenate ($LiAsF_6$), or the like. It is lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), or the like. It is lithium hexafluorosilicate ($Li_2SiF_6$), lithium chloride (LiCl), lithium bromide (LiBr), or the like. The reason is because it is possible to obtain excellent battery characteristics, cycle characteristics, preservation characteristics, and the like.

At least one kind selected from the group consisting of lithium hexafluorosilicate, lithium tetrafluoborate, lithium perchlorate, and lithium hexafluoroarsenate is preferable, and lithium hexafluorosilicate is more preferable. Since the internal resistance is decreased, it is possible to obtain a greater effect.

The content of electrolyte salt is preferably equal to or more than 0.3 mol/kg and equal to or less than 3.0 mol/kg with respect to the solvent. The reason is because it is possible to obtain high ion conductivity.

At least one of the positive electrode 21 (positive electrode active material layer 21B), the negative electrode 22 (negative electrode active material layer 22B), and the electrolyte solution preferably includes at least one of a heteropoly acid that a condensation product of two or more kinds of oxo-acids and a heteropoly acid compound. The reason is because a coating (SEI film) is formed on the surface of the electrode at the first time of charging. Since the coating derived from the heteropoly acid compound capable of absorbing and discharging lithium ions has excellent permeability for lithium ions, it is possible to suppress occurrence (particularly, in a high temperature circumstance) of gas (oxygen gas or the like) caused by the dissolution reaction of the positive electrode active material while suppressing the reaction of the electrode and the electrolyte solution without decreasing the cycle characteristics. The reason is because it is difficult to form unnecessary voids in the positive electrode active material layer 21B by a by-product derived from oxygen gas.

The heteropoly acid compound and the heteropoly acid constituting the heteropoly acid compound are a compound having poly-atoms selected from the following element group (a), or a compound having poly-atoms selected from the element group (a) and in which a part of the poly-atoms are replaced by at least several elements selected from the element group (b).

Element Group (a): Mo, W, Nb, V

Element Group (b): Ti, Cr, Mn, Fe, Co, Ni, Cu, Zn, Ga, Zr, Tc, Rh, Cd, In, Sn, Ta, Re, Tl, Pb The heteropoly acid compound and heteropoly acid are a compound having hetero atoms selected from the following element group (c), or a compound having hetero atoms selected from the element group (c) and in which a part of the hetero atoms are replaced by at least several elements selected from the element group (d).

Element Group (c): B, Al, Si, P, Cr, Mn, Fe, Co, Ni, Cu, Zn, Ge, As

Element Group (d): H, Be, B, C, Na, Al, Si, P, S, Ti, V, Cr, Mn, Fe, Co, Ni, Cu, Zn, Ga, Ge, As, Se, Zr, Rh, Sn, Sb, Te, I, Re, Pt, Bi, Ce, Th, U, Np Specifically, the heteropoly acid included in the heteropoly acid compound is, for example, heteropoly tungsten acid such as phosphotungstic acid and silicotungstic acid, or heteropoly molybdenum acid such as phosphomolybdenum acid and silicomolybdenum acid. A material including a plurality of poly elements may be phosphovanadomolybdate, phosphotungstousmolybdate, silicovanadomolybdate, silicotungstousmolybdate, or the like.

The heteropoly acid compound is, for example, at least one kind selected from the group consisting of compounds represented by the following formula (2) to formula (5).

$$H_xA_y(BD_6O_{24}).zH_2O \qquad (2)$$

where A is lithium, sodium Na, potassium K, rubidium Rb, cesium Ce, magnesium, calcium, aluminum, ammonium $NH_4$, ammonium salt, or phosphonium salt, B is silicon, arsenic As, or germanium Ge, D is at least one kind selected from the group consisting of vanadium V, chromium Cr, manganese, iron, cobalt, nickel, copper, zinc Zn, gallium Ga, zirconium, niobium Nb, molybdenum Mo, technetium Tc, rhodium Rh, cadmium Cd, indium In, tin, tantalum Ta, tungsten W, rhenium Re, and thallium Tl, and x is $0 \leq x \leq 8$, $0 \leq y \leq 8$, and $0 \leq z \leq 50$, at least one of x and y is not 0.

$$H_xA_y(BD_{12}O_{40}).zH_2O \qquad (3)$$

where A is lithium, sodium, potassium, rubidium, cesium, magnesium, calcium, aluminum, ammonium, ammonium salt, or phosphonium salt, B is phosphorus, silicon, arsenic, or germanium, D is at least one kind selected from the group consisting of titanium, vanadium, chromium, manganese, iron, cobalt, nickel, copper, zinc, gallium, zirconium, niobium, molybdenum, technetium, rhodium, cadmium, indium, tin, tantalum, tungsten, rhenium, and thallium, and x is $0 \leq x \leq 4$, $0 \leq y \leq 4$, and $0 \leq z \leq 50$, at least one of x and y is not 0.

$$H_xA_y(B_2D_{18}O_{62}).zH_2O \qquad (4)$$

where A is lithium, sodium, potassium, rubidium, cesium, magnesium, calcium, aluminum, ammonium, ammonium salt, or phosphonium salt, B is phosphorous, silicon, arsenic, or germanium, D is at least one kind selected from the group consisting of titanium, vanadium, chromium, manganese, iron, cobalt, nickel, copper, zinc, gallium, zirconium, niobium, molybdenum, technetium, rhodium, cadmium, indium, tin, tantalum, tungsten, rhenium, and thallium, and x is $0 \leq x \leq 8$, $0 \leq y \leq 8$, and $0 \leq z \leq 50$, at least one of x and y is not 0.

$$H_xA_y(B_5D_{30}O_{110}).zH_2O \qquad (5)$$

where A is lithium, sodium, potassium, rubidium, cesium, magnesium, calcium, aluminum, ammonium, ammonium salt, or phosphonium salt, B is phosphorous, silicon, arsenic, or germanium, D is at least one kind selected from the group consisting of titanium, vanadium, chromium, manganese, iron, cobalt, nickel, copper, zinc, gallium, zirconium, niobium, molybdenum, technetium, rhodium, cadmium, indium, tin, tantalum, tungsten, rhenium, and thallium, and x is $0 \leq x \leq 15$, $0 \leq y \leq 15$, and $0 \leq z \leq 50$, at least one of x and y is not 0.

It is preferably at least one of phosphomolybdic acid, phosphotungstic acid, silicomolybdic acid, and silicotungstic acid. The reason is because it is possible to obtain the greater effect. The content of heteropoly acid or the like in the positive electrode active material layer 22B is preferably 0.01 weight % to 3 weight %. The reason is because the occurrence of gas is suppressed without drastically decreasing the battery capacity or the like.

It is preferable that the heteropoly acid compound has, for example, positive ions such as $Li^+$, $Na^+$, $K^+$, $Rb^+$, $Cs^+$, $R_4N^+$, and $R_4P^+$ (in the formula, R is H or a hydrocarbon group with a carbon number of 10 or less). The positive ions are more preferably Li+, tetra-normal-butylammonium or tetra-normal-butylphosphonium.

Specifically, the heteropoly acid compound is, for example, a heteropoly tungstic acid compound such as silicotungstic acid sodium salt, phosphotungstic acid sodium salt, phosphotungstic acid ammonium salt, and silicotungstic acid tetra-tetra-n-butylphosphonium salt. In addition, the heteropoly acid compound is a heteropoly molybdenum acid compound such as phosphomolybdenum acid sodium salt, phosphomolybdenum acid ammonium salt, and phosphomolybdenum acid tri-tetra-n-butyl ammonium salt. In addition, the compound including a plurality of poly-atoms may be phosphotungstousmolybdate tri-tetra-n-ammonium salt or the like. As the heteropoly acid and heteropoly acid compound, two or more kinds may be mixed and used. The heteropoly acid or heteropoly acid compound is easily dissolved in a solvent, is stable in the battery, and does not easily have a negative influence such as reaction to other materials.

As described above, the heteropoly acid and heteropoly acid compound contribute to suppress the occurrence of gas or the like. For this reason, it is preferable that at least one of the positive electrode 21 and the negative electrode 22 be provided with a gel coating, more specifically, a gel coating derived from at least one of the heteropoly acid and the heteropoly acid compound. The gel coating includes a precipitate which the heteropoly acid or the heteropoly acid compound are electrolyzed at the time of charging or preliminary charging and are precipitated in a 3-dimensional mesh structure. That is, the gel coating includes at least one of amorphous poly acid having one or more kinds of poly elements and poly acid salt compounds, and is a gel form in which the amorphous poly acid and poly acid salt compound include the electrolyte solution. The coating grows in a thickness direction, but does not easily have a negative influence on conductivity of lithium ions. The separator 23 coming in contact with the positive electrode 21 or the negative electrode 22 is prevented and a large current rapidly flows, and momentary heat generation of the secondary battery is suppressed. The gel coating is preferably provided at least at a part of the surface of the positive electrode 21 or the like. The composition and existence of the gel coating can be confirmed by a scanning electron microscope (SEM), an X-ray absorption fine structure (XAFS) analysis, a TOF-SIMS method, or the like.

In the gel coating described above, it is preferable that a part of at least one of the poly acid and the poly acid compound in the negative electrode 22 be reduced, a valence of the poly-atoms is less than a value of 6, and at least one of the poly acid and the poly acid compound which is not reduced exists with the value of 6 as the valence of the poly-atom ions. The poly-atom ions in the reduction state as described above and the poly-atom ions in the non-reduction state coexist, stability of poly acid and poly acid compound having a gas absorption effect becomes high, and it is expected that resistance against the electrolyte solution is improved. The reduction state of at least one of the precipitated poly acid and poly acid compound can be confirmed by the X-ray photoelectron spectroscopy (XPS) analysis. In this case, after the battery is detached, cleaning is performed with dimethyl carbonate. This is to remove a low volatile solvent component and electrolyte salt existing on the surface. It is preferable that sampling is performed under as inert an atmosphere as possible. When it is doubtful that peaks reverted to a plurality of energies are overlapped, waveform analysis is performed on the measured spectrum to separate the peaks, thereby determining whether or not there is a peak reverted to tungsten or molybdenum of the value of 6 and the value less than 6.

Operation of Secondary Battery

In the secondary battery, for example, at the time of charging, the lithium ions discharged from the positive electrode 21 are absorbed to the negative electrode 22 through the electrolyte solution. For example, at the time of discharging, the lithium ions discharged from the negative electrode 22 are absorbed to the positive electrode 21 through the electrolyte solution. In this case, as described above, it is preferable that the charge voltage (for example, 4.6 V) at the first time of charging be higher than that at the first and subsequent time of the charging (for example, 4.35 V) to complete the reaction of occurrence of the irreversible capacity in the negative electrode 22 at the first time of charging.

Method of Producing Secondary Battery

The secondary battery is produced by, for example, the following sequence.

First, the positive electrode 21 is produced. First, the positive electrode active material is mixed with the positive electrode coupling agent and the positive electrode conductive agent into a positive electrode combination agent, and then is dispersed in the organic solvent or the like to be a paste positive electrode combination agent slurry. Subsequently, the positive electrode combination agent slurry is applied to both faces of the positive electrode collection body 21A and then is dried to form the positive electrode active material layer 21B. Last, while heating is performed as necessary, the positive electrode active material layer 21B is compressed and shaped using a roll press or the like. In this case, the compressing and shaping may be repeated many times.

Next, the negative electrode 22 is produced by the same sequence as that of the positive electrode 21. In this case, the negative electrode active material is mixed with the negative electrode coupling agent and the negative electrode conductive agent into a negative electrode combination agent, and then is dispersed in the organic solvent or the like to be a paste negative electrode combination agent slurry. Subsequently, the positive electrode combination agent slurry is applied to both faces of the positive electrode collection body 22A and then is dried to form the negative electrode active material layer 22B, and then the negative electrode active material layer 22B is compressed and shaped as necessary.

The negative electrode 22 may be produced by a sequence different from the positive electrode 21. In this case, the negative electrode material is deposited on both faces of the negative electrode collection body 22A using, for example, a gas phase method such as vapor deposition method, to compress and shape the negative electrode active material layer 22B.

Last, the secondary battery is assembled using the positive electrode 21 and the negative electrode 22. First, the positive electrode lead 25 is welded to the positive electrode collection body 21A, and the negative electrode lead 26 is welded to the negative electrode collection body 22A. Subsequently, the positive electrode 21 and the negative electrode 22 are laminated and wound through the separator 23 to produce the winding electrode body 20, and then the center pin 24 is inserted into the winding center. Subsequently, the winding electrode body 20 is housed in the battery can 11 between the pair of insulating plates 12 and 13. In this case, the leading end of the electrode lead 25 is welded to the safety valve mechanism 15, and the leading end of the negative electrode lead 26 is welded to the battery can 11. Subsequently, the electrolyte solution is injected into the battery can 11 to be impregnated in the separator 23. Last, the battery cap 14, the safety valve mechanism 15, and the thermal resistance element 16 are caulked to the passage end of the battery can 11 through the gasket 17.

Operation and Effect of Secondary Battery

According to the cylindrical secondary battery, the positive electrode active material layer 21B of the positive electrode 21 includes the positive electrode active material described above, and thus it is possible to obtain excellent battery performance.

Particularly, when the metal-based material or the oxide thereof in which the irreversible capacity is increased is used as the negative electrode active material of the negative electrode 22, it is possible to obtain the greater effect. The irreversible capacity is increased even when the low crystalline carbon or amorphous carbon is used as the negative electrode active material, and thus it is possible to obtain the same effect.

2-2. Positive Electrode and Lithium Ion Secondary Battery (Laminated Film Type)

Figure 3:
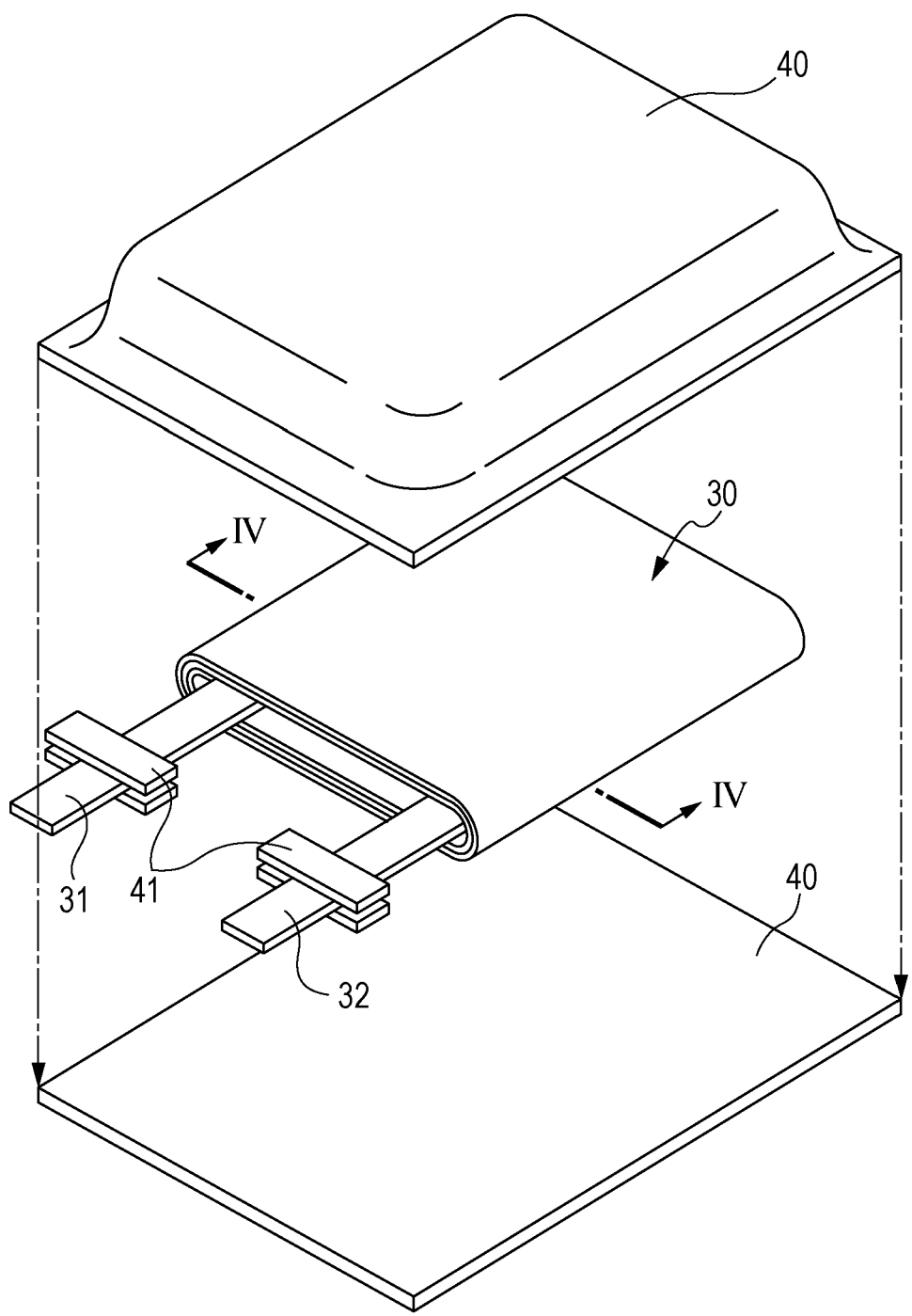
FIG. 3 is a perspective view illustrating a configuration of the other lithium ion secondary battery (laminated film type) using the positive electrode active material of the embodiment of the present disclosure.
Figure 4:
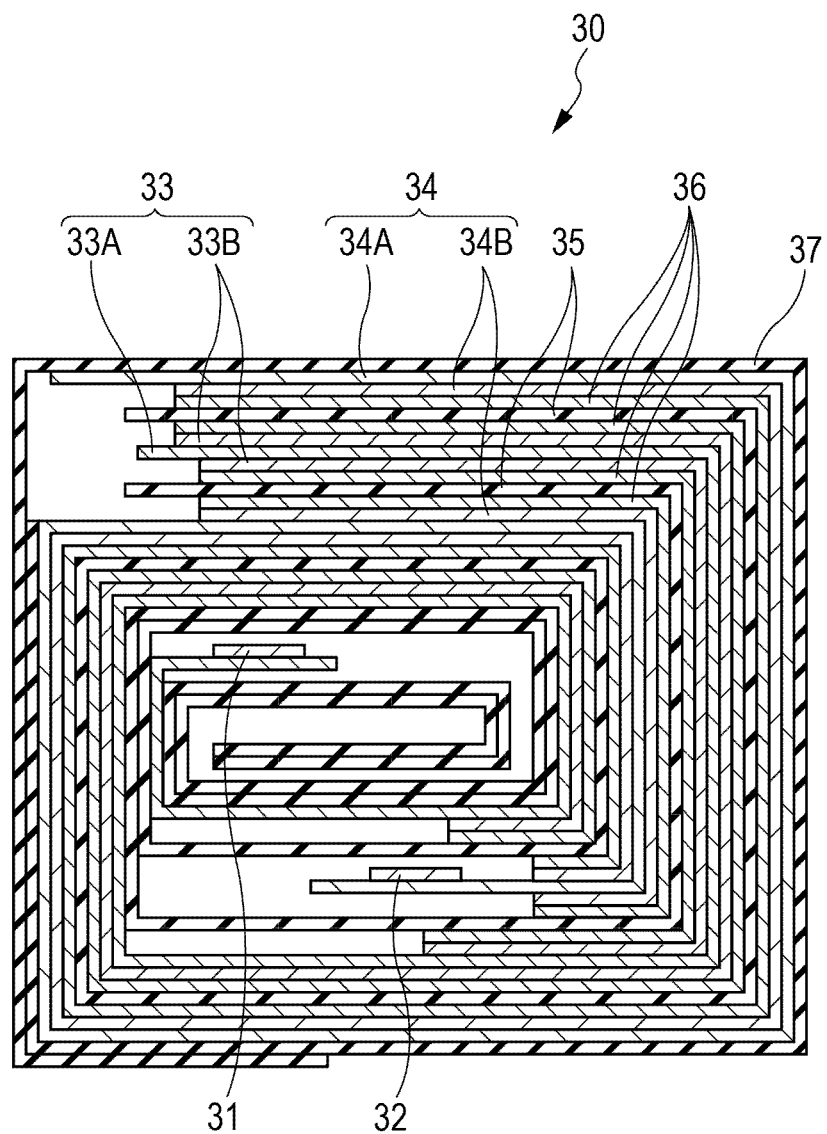
FIG. 4 is a cross-sectional view taken along the line IV-IV of the winding electrode body shown in FIG. 3.

FIG. 3 is an exploded perspective view illustrating a configuration of the laminated film type lithium ion secondary battery, and FIG. 4 is an enlarged cross-sectional view taken along the line IV-IV of the winding electrode body 30 shown in FIG. 3. Hereinafter, the constituent element of the cylindrical lithium ion secondary battery described above is cited as necessary.

Overall Configuration of Secondary Battery

In the secondary battery, mainly, the winding electrode body 30 is housed in a film type external member 40. In the winding electrode body 30, the positive electrode 33 and the negative electrode 34 are laminated and wound through the separator 35 and the electrolyte layer 36. The positive electrode 33 is provided with the positive lead 31, and the negative electrode 34 is provided the negative lead 32. The outermost circumferential portion of the winding electrode body 30 is protected by the protective tape 37.

The positive electrode lead 31 and the negative electrode lead 32 are derived in the same direction, for example, from the inside to the outside of the external member 40. The positive electrode lead 31 is formed of, for example, a conductive material such as aluminum, and the negative electrode lead 32 is formed of, for example, a conductive material such as copper, nickel, and stainless steel. Such a material has, for example, a thin plate shape or a mess shape.

The external member 40 is, for example, a laminated film in which a fusion layer, a metal layer, and a surface protective layer are laminated in this order. In the laminated film, for example, the outer circumferential portions of the fusion layer of two sheets of films are fused or adhered to each other by an adhesive or the like such that the fusion layer is opposed to the winding electrode body 30. The fusion layer is, for example, a film such as polyethylene and polypropylene. The metal layer is, for example, an aluminum foil or the like. The surface protective layer is, for example, a film such as nylon and polyethylene terephthalate.

The external member 40 is preferably an aluminum laminated film in which a polyethylene film, an aluminum foil, and a nylon film are laminated in this order. However, the external member 40 may be a laminate film having the other laminated structure, and may be a polymer film such as polypropylene or a metal film.

An adhesive film 41 is inserted between the external member 40 and the positive electrode lead 31 and the negative electrode lead 32 to prevent outer air from being infiltrated. The adhesive film 41 is formed of a material having adhesion to the positive electrode lead 31 and the negative electrode lead 32. Such a material is, for example, polyolefin resin such as polyethylene, polypropylene, denatured polyethylene, and denatured polypropylene.

In the positive electrode 33, for example, the positive electrode active material layer 33B is provided on both faces of the positive electrode collection body 33A. In the negative electrode 34, for example, the negative electrode active material layer 34B is provided on both faces of the negative electrode collection body 34A. The configurations of the positive electrode collection body 33A, the positive electrode active material layer 33B, the negative electrode collection body 34A, and the negative electrode active material layer 34B are the same as the configurations of the positive electrode collection body 21A, the positive electrode active material layer 21B, the negative electrode collection body 22A, and the negative electrode active material layer 22B, respectively. The configuration of the separator 35 is the same as the configuration of the separator 23.

In the electrolyte layer 36, the electrolyte solution is kept by the polymer compound, and the electrolyte layer 36 may include the other material such as an additive agent as necessary. The electrolyte layer 36 is a so-called gel electrolyte. The gel electrolyte is preferable since it is possible to obtain high ion conductivity (for example, 1 mS/cm or higher at a room temperature) and liquid leakage of the electrolyte solution is prevented.

The polymer compound is, for example, any one or more kinds of the following polymer materials. It is polyacrylonitrile, polyvinylidene fluoride, polytetrafluoroethylene, polyhexafluoropropylene, polyethylene oxide, polypropylene oxide, polyphosphazene, polysiloxane, or polyvinyl fluoride. It is polyvinyl acetate, polyvinyl alcohol, polymethylmethacrylate, polyacrylic acid, polymethacrylate, styrene-butadiene rubber, nitrile-butadiene rubber, polystyrene, or polycarbonate. It is copolymer of vinylidene fluoride and hexafluoropyrene. Among them, polyvinylidene fluoride and copolymer of vinylidene fluoride and hexafluoropyrene is preferable. The reason is because it is electrochemically stable.

The composition of the electrolyte solution is the same as the composition of the electrolyte solution described with respect to the cylindrical type. However, in the electrolyte layer 36 that is the gel electrolyte, the non-aqueous solvent of the electrolyte solution is a wide concept including a material having ion conductivity capable of dissociating electrolyte salt as well as a liquid solvent. Accordingly, when the polymer compound having ion conductivity is used, the polymer compound is also included in the solvent.

In addition, the electrolyte solution may be used instead of the gel electrolyte layer 36. In this case, the electrolyte solution is impregnated in the separator 35.

Operation of Secondary Battery

In the secondary battery, for example, at the time of charging, the lithium ions discharged from the positive electrode 33 are absorbed to the negative electrode 34 through the electrolyte layer 36. For example, at the time of discharging, the lithium ions discharged from the negative electrode 34 are absorbed to the positive electrode 53 through the electrolyte layer 36. Also in this case, it is preferable that the charge voltage at the first time of charging be higher than that at the first and subsequent time of the charging to complete the reaction of occurrence of the irreversible capacity in the negative electrode 34 at the first time of charging.

Method of Producing Secondary Battery

The secondary battery provided with the gel electrolyte layer 36 is produced by, for example, the following three kinds of sequences.

In the first sequence, first, the positive electrode 33 and the negative electrode 34 are produced by the same production method as that of the positive electrode 21 and the negative electrode 22. In this case, the positive electrode active material layer 33B is formed on both faces of the positive electrode collection body 33A to produce the positive electrode 33, and the negative electrode active material layer 34B is formed on both faces of the negative electrode collection body 34A to produce the negative electrode 34. Subsequently, a precursor solution including the electrolyte solution, the polymer compound, and the solvent such as an organic solvent is prepared, and then the precursor solution is applied to the positive electrode 33 and the negative electrode 34 to form the gel electrolyte layer 36. Subsequently, the positive electrode lead 31 is welded to the positive electrode collection body 33A, and the negative electrode lead 32 is welded to the negative electrode collection body 34A. Subsequently, the positive electrode 33 and the negative electrode 34 provided with the electrolyte layer 36 are laminated and wound through the separator 35 to produce the winding electrode body 30, and then the protective tape 37 is adhered to the outermost circumferential portion. Last, the winding electrode body 30 is interposed between two sheets of film type external members 40, then the outer circumferential portions of the external member 40 are thermally fused and adhered to each other, and the winding electrode body 30 is sealed into the external members 40. In this case, the adhesion film 41 is inserted between the positive electrode lead 31 and negative electrode lead 32 and the external members 40.

In the second sequence, first, the positive electrode lead 31 is connected to the positive electrode 33, and the negative electrode lead 52 is connected to the negative electrode 34. Subsequently, the positive electrode 33 and the negative electrode 34 are laminated and wound through the separator 35 to produce a winding body that is a precursor of the winding electrode body 30, and then the protective tape 37 is adhered to the outermost circumferential portion. Subsequently, the winding electrode body 30 is interposed between two sheets of film type external members 40, then the outer circumferential portions other than the outer circumferential portion of one side are thermally fused and adhered, and the winding body is housed in the pouch-shaped external member 40. Subsequently, an electrolyte composition including the other materials such as the electrolyte solution, a monomer that is a raw material of the polymer compound, a polymerization start agent, and a polymerization prohibition agent as necessary is prepared and is injected into the pouch-shaped external member 40, and then the opened portion of the external member 40 is thermally fused and sealed. Last, the monomer is thermally polymerized to be a polymer compound, to form the gel electrolyte layer 36.

In the third sequence, first, the winding body is produced in the same sequence as the second sequence described above and is housed in the pouch-shaped external member 40, except that the separator 35 applied to both faces of the polymer compound is used. The polymer compound applied to the separator 35 may be, for example, a polymer (homopolymer, copolymer, or multicomponent copolymer) including vinylidene fluoride. Specifically, it is a 2-component copolymer including polyvinylidene fluoride, vinylidene fluoride, and hexafluoropropylene, and a 3-component copolymer including vinylidene fluoride, hexafluoropropylene, and chlorotrifluoroethylene. One or more kinds of other polymer compounds may be used with a polymer including vinylidene fluoride. Subsequently, the electrolyte solution is prepared and is injected into the external member 40, and then the opened portion of the external member 40 is sealed by the thermal fusion method. Last, the external member 40 is weighted and heated, and the separator 35 is adhered close to the positive electrode 33 and the negative electrode 34 through the polymer compound. Accordingly, since the electrolyte solution is impregnated in the polymer compound, the polymer compound becomes gel and the electrolyte layer 36 is formed.

In the third sequence, the battery swell is further suppressed compared with the first sequence. In the third sequence, the monomer that is the raw material of the polymer compound or the solvent rarely remains in the electrolyte layer 36 as compared with the second sequence, and thus a process of forming the polymer compound is satisfactorily controlled. For this reason, it is possible to obtain sufficient adhesion between the positive electrode 33, the negative electrode 34, and the separator 35, and the electrolyte layer 36.

Operation and Effect of Secondary Battery

According to the laminated film type secondary battery, since the positive electrode active material layer 33B of the positive electrode 33 includes the positive electrode active material described above, it is possible to obtain excellent battery performance. The other operations and effects are the same as the cylindrical type.

2-3. Positive Electrode and Lithium Metal Secondary Battery

The secondary battery described herein is a lithium metal secondary battery in which the capacity of the negative electrode is represented by precipitation and dissolution of lithium metal. The secondary battery has the same configuration as that of the cylindrical lithium ion secondary battery described above except that the negative electrode active material layer 22B is configured by the lithium metal, and is produced by the same sequence.

The secondary battery uses lithium metal as the negative electrode active material, and thus it is possible to obtain high energy density. The negative electrode active material layer 22B may already exist from the time of assembling, but may not exist at the time of assembling and may be configured by lithium metal precipitated at the time of charging. The negative electrode active material layer 22B may be used also as the collection body, and the negative electrode collection body 22A may not be provided.

In the secondary battery, for example, at the time of charging, the lithium ions are discharged from the positive electrode 21, and becomes lithium metal and is precipitated on the surface of the negative electrode collection body 22A through the electrolyte solution impregnated in the separator 23. For example, at the time of discharging, the lithium metal becomes the lithium ions from the negative electrode active material layer 22B and is eluted, and is absorbed to the positive electrode 21 through the electrolyte solution impregnated in the separator 23.

According to the secondary battery, since the positive electrode active material layer 21B of the positive electrode 21 includes the positive electrode active material described above, it is possible to obtain excellent battery performance. The other operations and effects are the same as those of the cylindrical lithium ion secondary battery. In addition, the secondary battery described herein is not limited to the cylindrical type, and may be applied to the laminated film type described above.

3. Usage of Lithium Secondary Battery

Examples of application of the lithium secondary battery described above will be described.

The usage of the secondary battery is not particularly limited as long as it is in a machine, apparatus, tool, device, or system (a plurality of groups of apparatuses) in which the secondary battery can be used as a driving power supply or a power storage source for power storage. When the secondary battery is used as the power supply, it may be a main power supply (primarily used power supply), and a supplementary power supply (power supply used instead of the main power supply or replaced from the main power supply). In the latter case, the main power supply is not limited to the secondary battery.

The usage of the secondary battery may be, for example, the following usages. It is a mobile electronic apparatus such as a video camera, a digital still camera, a mobile phone, a laptop PC, a wireless phone, a headphone stereo, a mobile radio, a mobile TV, or a mobile information terminal (PDA:

personal digital assistant). It is a home appliance such as an electric shaver. It is a storage device such as a backup power supply and a memory card. It is an electric tool such as an electric drill and an electric cutter. It is a medical electronic apparatus such as a pacemaker and a hearing aid. It is an electric vehicle (including a hybrid vehicle). It is a power storage system such as a home battery system storing power for an emergency.

It is effective that the secondary battery is applied to the electric tool, the electric vehicle, or the power storage system. Excellent characteristics are necessary for the secondary battery, and it is possible to effectively improve the characteristics by using the secondary battery according to the embodiment of the present disclosure. In the electric tool, the secondary battery is used as the driving power supply to operate a movable portion (for example, a drill). The electric vehicle operates (drives) using the secondary battery as the driving power supply, and may be a vehicle (hybrid vehicle) also provided with a driving source other than the secondary battery as described above. The power storage system is a system using the secondary battery as a power storage source. For example, in the home power storage system, power is accumulated in the secondary battery that is the power storage source, and the power stored in the secondary battery is consumed as necessary, thereby using various apparatuses such as home appliances.

EXAMPLES

Specific examples of the present disclosure will be described in detail.

Experiment Examples 1-1 to 1-15

Synthesis of Positive Electrode Active Material

The positive electrode active material was obtained by the following sequence. First, lithium carbonate $Li_2Co_3$, manganese carbonate $MnCo_3$, cobalt hydroxide $Co(OH)_2$, nickel hydroxide $Ni(OH)_2$, and aluminum nitrate nonahydrate $Al(NO_3)_3 \cdot 9H_2O$ which are raw materials were mixed, and then were sufficiently crushed using a ball mill using water as a dispersion medium. In this case, the mixed ratio of the raw materials was adjusted such that the composition (molar ratio) of the obtained complex oxide was Li:Mn:Co:Ni:Al=1.13:0.6:0.2:0.2:0.01. Subsequently, the obtained mixture was baked in the atmosphere at 850° for 12 hours, and the complex oxide $(Li_{1.13}(Mn_{0.6}Co_{0.2}Ni_{0.2})_{0.87}M1_{0.01}O_2)$ including aluminum as the element M1 was synthesized. Subsequently, magnesium phosphate that is the M2-containing compound was weighed and mixed such that the molar ratio with respect to the complex oxide is Li:Mg=100:1, then was processed for 1 hour using the mechanochemical device, and magnesium phosphate was attached to the surface of the complex oxide. Last, the temperature was raised at a rate of 3° C./min and baking was performed at 900° C. for 3 hours. Accordingly, the positive electrode active material was obtained in which the element M2 (magnesium) was incorporated in the surface layer area of the complex oxide including the element M1 (aluminum). The content of element M2 was 1 mol % with respect to lithium.

A series of positive electrode active materials were obtained by the same sequence so as to be the composition of the complex oxide and the content of the element M2 shown in Table 1, except that the mixed ratio of the raw materials and the mixing amount of the M2-containing compound were changed, using magnesium phosphate and titanium dioxide with lithium hydroxide (LiOH), manganese carbonate, cobalt hydroxide, and nickel hydroxide further as the raw materials, and aluminum nitrate nonahydrate, glucose, nickel hydroxide, and lithium fluoride as the M2-containing compound, respectively.

Production of Secondary Battery

To inspect the battery performance using the positive electrode active material, the laminated film type lithium ion secondary battery shown in FIG. 3 and FIG. 4 was produced.

First, the positive electrode 33 was produced. In this case, 90 mass parts of the positive electrode active material, 5 mass parts of polyvinylidene difluoride (PVDF) that is the positive electrode coupling agent, and 5 part by mass of amorphous carbon powder (ketjen black) were mixed into the positive electrode combination agent. Subsequently, the positive electrode combination agent was dispersed in N-methyl-2-pyrolidone (NMP) to be the positive electrode combination agent slurry. Subsequently, the positive electrode combination agent slurry was uniformly applied to both faces of the positive electrode collection body 33A (aluminum foil: thickness=15 μm), and then was dried by using a warm airflow to form the positive electrode active material layer 33B. Last, the positive electrode active material layer 33B was compressed and shaped using a roll press machine, and then was cut in a stripe shape (48 mm×300 mm).

Then, the negative electrode 34 was produced. In this case, the negative electrode active material shown in Table 1 and the 20 weight % NMP solution of polyimide were mixed at a weight ratio of 7:2 to be the negative electrode combination agent. The negative electrode active material was graphite (mesocarbon microbead (MCMB)), a single substance of silicon, a single substance of tin, or silicon oxide (SiO), and the median diameter is 15 μm in graphite and 7 μm in the others. Subsequently, the negative electrode combination agent slurry was uniformly applied to both faces of the negative electrode collection body 34A (copper foil: thickness=15 μm), was dried at 80° C., then was compressed and shaped using the roll press machine and heated at 700° C. for 3 hours to form the negative electrode active material layer 34B. Last, the negative electrode active material layer 34B was cut in a stripe shape (50 mm×310 mm).

Last, the secondary battery was assembled using the positive electrode 33 and the negative electrode 34. In this case, the positive electrode lead 25 formed of aluminum was welded to the positive electrode collection body 33A of the positive electrode 33, and the negative electrode lead 26 formed of copper was welded to the negative electrode collection body 34A of the negative electrode 34. Subsequently, the positive electrode 33 and the negative electrode 34 were laminated through the separator 35 (fine porous polyethylene film: thickness=25 μm) and were wound in a longitudinal direction to produce the winding electrode body 30, and then the protective tape 37 was attached to the outermost circumferential portion. Subsequently, the winding electrode body 30 was interposed between two sheets of film type external members 40, and then the outer circumferential portions of three sides of the external members 40 were thermally fused to each other to be a pouch shape. The external member 40 was a wet resistance aluminum laminated film in which the nylon film (thickness=25 μm), the aluminum foil (thickness=40 μm), and the polypropylene film (thickness=30 μm) were laminated from the outer side. Last, the electrolyte solution in which the electrolyte salt ($LiPF_6$) was dissolved in the solvent (ethylene carbonate (EC) and ethylmethyl carbonate (EMC)) was injected into the external member 40 and was impregnated in the separator 35, and then the other side of the external member 40 was thermally fused in the decompressed circumstance. In the electrolyte solution, the composition of the solvent (mass ratio) was EC:EMC=50:50, and the content of the electrolyte salt was 1 mol/dm$^3$ (=1 mol/l) with respect to the solvent.

Measurement of Battery Performance

The battery performance (battery capacity characteristics, cycle characteristics, preservation characteristics, and swell characteristics) was inspected using the laminated film type secondary battery described above, and the result shown in Table 1 was obtained.

When the battery capacity characteristics and the cycle characteristics were inspected, the second cycle discharge capacity (mAh) and the cycle maintenance ratio (%) after 300 cycles were acquired by the following sequence. In this case, the secondary battery was charged and discharged at 2 cycles in the circumstance of 23° C., and the second cycle discharge capacity (mAh) was measured. Subsequently, the secondary battery was charged and discharged until the sum of the number of cycles was 300 times, and the 300th cycle discharge capacity (mAh) was measured. Last, the cycle maintenance ratio (%)=(300th cycle discharge capacity/second cycle discharge capacity)×100 was calculated. In addition, at the time of the first cycle charge and discharge, charging was performed with constant current until the battery voltage reaches 4.6 V with 1000 mA, subsequently charging was performed with the constant voltage until the current value becomes narrow to 1 mA with constant voltage of 4.6 V, and then charging was performed with constant current until the battery voltage reaches 2.5 V with 500 mA. At the time of the charge and discharge of the second and subsequent cycles, the charging and discharging were performed in the same condition as that of the first cycle, except that the target battery voltage at the time of constant current charging is changed to 4.35 V.

When the preservation characteristics were inspected, the secondary battery was preserved in the circumstance of 60° C. for 300 hours in a state where the secondary battery was charged to the second cycle, then the secondary battery was discharged, and the discharge capacity (mAh) of the second cycle was measured. From this result, the preservation maintenance ratio (%)=(second cycle (after preservation) discharge capacity/second cycle (before preservation) discharge capacity)×100 was calculated. In addition, the charge and discharge conditions are the same as those when the battery capacity characteristics were inspected.

When the swell characteristics were inspected, the thickness (mm) of the secondary battery before the charging and discharging was measured, then the secondary battery was charged and discharged by one cycle, and the thickness (mm) after charging and discharging was measured. From this result, the swell amount (mm)=thickness after charging and discharging-thickness before charging and discharging was calculated. In addition, the charge and discharge conditions were the same as the first cycle charge and discharge condition when the battery capacity characteristics were inspected.

TABLE 1

| | Positive Electrode Active Material $(Li_{1+a}(Mn_bCo_cNi_{1-b-c})_{1-d}M1_dO_{2-e} + M2)$ | | | | | | | Negative Electrode | | Cycle Maintenance | Preservation Maintenance | |
|---|---|---|---|---|---|---|---|---|---|---|---|---|
| | | | | | | | M2 | | Charge | | | |
| | a | b | c | d | e | M1 | Kind | Content (mol %) | Active Material | Capacity (mAh) | Ratio (%) | Ratio (%) | Swell Amount (mm) |
| Ex. 1-1 | 0.13 | 0.6 | 0.2 | 0.01 | 0 | Al | Mg | 1 | SiO | 917 | 84 | 93 | 8.98 |
| Ex. 1-2 | 0.13 | 0.6 | 0.2 | 0.01 | 0 | Mg | Al | 1 | SiO | 908 | 89 | 91 | 9.00 |
| Ex. 1-3 | 0.13 | 0.6 | 0.2 | 0.2 | 0 | Al | C | 1 | SiO | 932 | 91 | 92 | 8.76 |
| Ex. 1-4 | 0.05 | 0.6 | 0.2 | 0.05 | 0 | Mg | Ni | 1 | SiO | 888 | 88 | 91 | 8.24 |
| Ex. 1-5 | 0.13 | 0.6 | 0.2 | 0.01 | 0 | Ti | Mg | 1 | SiO | 910 | 80 | 91 | 9.05 |
| Ex. 1-6 | 0.15 | 0.6 | 0.2 | 0.02 | 0 | Al | Mg | 1 | SiO | 898 | 89 | 92 | 9.11 |
| Ex. 1-7 | 0.13 | 0.6 | 0.2 | 0.01 | 0 | Al | Mg | 5 | SiO | 896 | 90 | 90 | 9.01 |
| Ex. 1-8 | 0.2 | 0.6 | 0.2 | 0.01 | 0 | Al | Mg | 1 | SiO | 901 | 89 | 91 | 9.21 |
| Ex. 1-9 | 0.13 | 0.6 | 0.2 | 0.01 | 1 | Al | Mg | 1 | SiO | 915 | 87 | 88 | 8.79 |
| Ex. 1-10 | 0.13 | 0.6 | 0.2 | 0.2 | 0 | Al | Mg | 1 | SiO | 928 | 91 | 92 | 8.81 |
| Ex. 1-11 | 0.13 | 0.6 | 0.2 | 0.2 | 0 | Al | F | 1 | SiO | 922 | 87 | 89 | 8.78 |
| Ex. 1-12 | 0.13 | 0.6 | 0.2 | 0.2 | 0 | Ti | Mg | 1 | SiO | 902 | 96 | 89 | 9.19 |
| Ex. 1-13 | 0.13 | 0.6 | 0.2 | 0.01 | 0 | Al | Mg | 1 | Si | 921 | 93 | 90 | 9.96 |
| Ex. 1-14 | 0.13 | 0.6 | 0.2 | 0.01 | 0 | Al | Mg | 1 | Sn | 908 | 92 | 92 | 8.81 |
| Ex. 1-15 | 0.13 | 0.6 | 0.2 | 0.01 | 0 | Al | Mg | 1 | C | 861 | 90 | 89 | 7.98 |

Experiment Examples 2-1 to 2-11

The positive electrode active material was synthesized and the secondary battery was produced by the same sequence as Experiment Examples 1-1 to 1-15, except that the existence of the elements M1 and M2 is changed as shown in Table 2 for comparison. The battery performance of the secondary battery was inspected, and the result shown in Table 2 was obtained.

TABLE 2

| | Positive Electrode Active Material $(Li_{1+a}(Mn_bCo_cNi_{1-b-c})_{1-d}M1_dO_{2-e} + M2)$ | | | | | | | Negative | | Cycle | Preservation | |
|---|---|---|---|---|---|---|---|---|---|---|---|---|
| | | | | | | | M2 | Electrode | Charge | Maintenance | Maintenance | Swell |
| | a | b | c | d | e | M1 | Kind | Content (mol %) | Active Material | Capacity (mAh) | Ratio (%) | Ratio (%) | Amount (mm) |
| Ex. 2-1 | 0.13 | 0.6 | 0.2 | 0 | 0 | — | — | — | SiO | 912 | 64 | 78 | 18.6 |
| Ex. 2-2 | 0.13 | 0.6 | 0.2 | 0.01 | 0 | Al | — | — | SiO | 921 | 68 | 81 | 8.61 |
| Ex. 2-3 | 0.25 | 0.6 | 0.2 | 0.01 | 0 | Ti | Mg | 1 | SiO | 843 | 83 | 90 | 20.1 |
| Ex. 2-4 | 0 | 0.6 | 0.2 | 0.01 | 0 | Ti | Mg | 1 | SiO | 749 | 86 | 92 | 8.19 |
| Ex. 2-5 | 0.13 | 0.2 | 0.3 | 0.01 | 0 | Al | Mg | 1 | SiO | 826 | 87 | 91 | 9.21 |
| Ex. 2-6 | 0.13 | 0.7 | 0.2 | 0.01 | 0 | Al | Mg | 1 | SiO | 855 | 85 | 80 | 8.59 |
| Ex. 2-7 | 0.13 | 0.6 | 0.8 | 0.01 | 0 | Al | Mg | 1 | SiO | 819 | 86 | 86 | 8.71 |
| Ex. 2-8 | 0.13 | 0.6 | 0.2 | 0.01 | 1.1 | Mg | Al | 1 | SiO | 551 | 56 | 85 | 8.98 |
| Ex. 2-9 | 0.13 | 0.6 | 0.2 | 0.3 | 0 | Al | Mg | 1 | SiO | 821 | 82 | 89 | 9.12 |
| Ex. 2-10 | 0.13 | 0.6 | 0.2 | 0 | 0 | — | Mg | 1 | SiO | 887 | 81 | 79 | 5.36 |
| Ex. 2-11 | 0.13 | 0.6 | 0.2 | 0.01 | 0 | Mg | — | — | SiO | 920 | 69 | 78 | 9.31 |

When the element M2 was incorporated in the crystal structure in the surface layer area of the complex oxide including the element M1 shown in the formula (1) and the positive electrode active material was used in which the composition ratio (a to e range) of the constituent element is in a predetermined range, as compared with the case of using the other positive electrode active materials, all of the discharge capacity, the cycle capacity maintenance ratio, and the preservation capacity maintenance ratio were increased, and the swell amount was suppressed.

Specifically, when the positive electrode active material includes only the element M1, the swell amount is drastically decreased, and the discharge capacity, the cycle capacity maintenance ratio, and the preservation capacity maintenance ratio are only slightly increased. Meanwhile, when the positive electrode active material includes only the element M2, the swell amount is drastically decreased, the cycle capacity maintenance ratio and the preservation capacity maintenance ratio are only slightly increased, and the discharge capacity is drastically decreased. On the contrary, without depending on the content of the element M2. However, when the additive amount is 0.01 mol % to 5 mol %, all battery performances are satisfactory.

Paying attention to the kinds of the negative electrode active materials, it is possible to obtain high battery capacity when using the metal-based material or the oxide (Si, Sn, or SiO) thereof, as compared with the case of using the carbon material (graphite). In addition, although using the metal-based material, it is possible to obtain the high cycle capacity maintenance ratio and the preservation maintenance ratio, and the swell amount is also suppressed.

Experiment Examples 3-1 to 3-4

As shown in Table 3, The positive electrode active material was synthesized and the secondary battery was produced by the same sequence as Experiment Examples 1-1 to 1-15, except that the silicotungstic acid that is the heteropoly acid was added to the positive electrode combination agent. The battery performance of the secondary battery was inspected, and the result shown in Table 3 were obtained.

TABLE 3

| | Positive Electrode Active Material $(Li_{1+a}(Mn_bCo_cNi_{1-b-c})_{1-d}M1_dO_{2-e} + M2)$ | | | | | | | | Additive Agent | | Negative Electrode | Charge | Cycle Maintenance | Preservation Maintenance | Swell |
|---|---|---|---|---|---|---|---|---|---|---|---|---|---|---|---|
| | | | | | | | M2 | | | | | | | | |
| | a | b | c | d | e | M1 | Kind | Content (mol %) | Kind | Content (mol %) | Active Material | Capacity (mAh) | Ratio (%) | Ratio (%) | Amount (mm) |
| Ex. 3-1 | 0.13 | 0.3 | 0.1 | 0.01 | 0 | Al | Mg | 1 | silicotungstic acid | 0.5 | SiO | 908 | 86 | 93 | 4.06 |
| Ex. 3-2 | 0.13 | 0.6 | 0.2 | 0.01 | 0 | Al | Mg | 1 | | 0.3 | SiO | 927 | 88 | 91 | 4.95 |
| Ex. 3-3 | 0.13 | 0.5 | 0.2 | 0.01 | 0 | Al | Mg | 1 | | 0.3 | Si | 1120 | 90 | 92 | 5.17 |
| Ex. 3-4 | 0.13 | 0.6 | 0.2 | 0.01 | 0 | Ti | Mg | 0.1 | | 0.5 | SiO | 908 | 86 | 93 | 4.13 | when the positive electrode active material includes the elements M1 and M2, the swell amount is drastically decreased, the discharge capacity, the cycle capacity maintenance ratio, and the preservation capacity maintenance ratio are also drastically increased.

When each of a to e shown in the formula (1) is in a proper range, all of the discharge capacity, the cycle capacity maintenance ratio, and the preservation capacity maintenance ratio are increased, and the swell amount is suppressed. When only one of a to e is not in a proper range, a part of battery performance is decreased.

The positive electrode active material includes the elements M1 and M2, the battery performance is improved When the positive electrode active material layer 3B includes the heteropoly acid, the discharge capacity, the cycle capacity maintenance ratio, and the preservation capacity maintenance ratio are substantially maintained and the swell amount is drastically decreased, as compared with the case not including the heteropoly acid.

From the result of Table 1 to Table 3, when the positive electrode active material was used in which the element M2 different from the element M1 was incorporated in the crystal structure in the surface layer area of the complex oxide including the element M1 shown in the formula (1) and the composition ratio of the constituent element was in a predetermined range, all of the discharge capacity, the cycle capacity maintenance ratio, it is possible to obtain the excellent discharge capacity, cycle capacity maintenance ratio, preservation capacity maintenance ratio, and swell amount.

The present disclosure has been described above with reference to the embodiments and examples, but the present disclosure is not limited to the embodiments and examples, and may be variously modified. For example, in the positive electrode active material of the present disclosure, the capacity of the negative electrode includes the capacity based on the absorption and discharge of the lithium ions and the capacity based on the precipitation and dissolution of the lithium metal, and the positive electrode active material may be applied to the lithium ion secondary battery represented by the sum of the capacities in the same manner. In this case, the charge capacity of the negative electrode material is set to be lower than the discharge capacity of the positive electrode.

In the embodiments and examples, the case where the battery structure is the cylindrical type or the laminated film type, or the case where the battery element has the winding structure has been described by way of examples, but are not limited thereto. The lithium ion secondary battery of the present disclosure can be applied to a case of having the other battery structure such as a coin type, an angle type, and a button type, or a case where the battery element has the other structure such as a laminated structure, in the same manner.

In the embodiments and examples, in the composition (the values of a to e) of the complex oxide shown in the formula (1), the proper range derived from the result of the examples is described. However, the description does not completely deny a probability in which the composition is out of the range described above. That is, since the proper range described above is merely a particularly preferable range to obtain the effect of the present disclosure, the composition may slightly deviate from the range described above as long as it is possible to obtain the effect of the present disclosure.

For example, the positive electrode active material or the positive electrode of the present disclosure is not limited to the lithium secondary battery, and may be applied to another device such as a capacitor.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A lithium secondary battery, comprising:
a positive electrode;
a negative electrode; and
an electrolyte solution,
wherein the positive electrode comprises a positive electrode active material that comprises an element M2 incorporated in a crystal structure in a surface layer area of a complex oxide,
wherein the element M2 is carbon,
wherein the complex oxide comprises an element M1 and is represented by formula (1):

$$Li_{1+a}(Mn_bCo_cNi_{1-b-c})_{1-d}M1_dO_{2-e} \quad (1),$$

wherein the element M1 is at least one of aluminum, magnesium, zirconium, titanium, barium, boron, silicon, or iron, and
wherein a satisfies $0<a<0.25$, b satisfies $0.5 \leq b<0.7$, c satisfies $0 \leq c<1-b$, d satisfies $0.01 \leq d \leq 0.2$, and e satisfies $0 \leq e \leq 1$.

2. The lithium secondary battery according to claim 1, wherein an amount of the element M2 in the positive electrode active material is 0.01 mol % to 5 mol % with respect to an amount of lithium.

3. The lithium secondary battery according to claim 1, wherein the element M1 is at least one of aluminum, magnesium, or titanium.

4. The lithium secondary battery according to claim 3, wherein the element M1 is aluminum.

5. The lithium secondary battery according to claim 1, wherein the a satisfies $0.1<a<0.25$.

6. The lithium secondary battery according to claim 1, wherein a compound that comprises the element M2 is deposited on the surface layer area of the complex oxide by a mechanochemical reaction, and
wherein the positive electrode active material is burned based on the deposited element M2 on the surface layer area.

7. The lithium secondary battery according to claim 6, wherein the compound is a solid solution with the complex oxide.

8. The lithium secondary battery according to claim 1, wherein a negative electrode active material of the negative electrode comprises a metal-based material, and
wherein the metal-based material comprises at least one of silicon or tin as a constituent element.

9. The lithium secondary battery according to claim 8, wherein the negative electrode active material is a silicon oxide $SiO_v$, and
wherein v satisfies $0.2<v<1.4$.

10. The lithium secondary battery according to claim 1, wherein at least one of the positive electrode, the negative electrode, or the electrolyte solution comprises at least one of a heteropoly acid or a heteropoly acid compound.

11. The lithium secondary battery according to claim 1, wherein at least one of the positive electrode or the negative electrode is provided with a gel coating,
wherein the gel coating comprises at least a compound,
wherein the compound is at least one of an amorphous polyacid compound or a polyacid salt compound, and
wherein the amorphous polyacid compound comprises at least one poly-element.

12. The lithium secondary battery according to claim 11, wherein the gel coating is based on at least one of a heteropoly acid or a heteropoly acid compound.

13. The lithium secondary battery according to claim 12, wherein the at least one of the amorphous polyacid compound or the polyacid salt compound comprises one of hexavalent poly-atom ions or poly-atom ions with a valence less than six.

14. The lithium secondary battery according to claim 10, wherein the at least one of the heteropoly acid or the heteropoly acid compound is at least a compound selected from one of compounds represented by formulas (2) to (5):

$$H_xA_y(BD_6O_{24}) \cdot zH_2O \quad (2),$$

wherein A is at least one of lithium, sodium, potassium, rubidium, cesium, magnesium, calcium, aluminum, ammonium, ammonium salt, or phosphonium salt, wherein B is at least one of silicon, arsenic, or germanium, wherein D is at least one of titanium, vanadium, chromium, manganese, iron, cobalt, nickel, copper, zinc, gallium, zirconium, niobium, molybdenum, technetium, rhodium, cadmium, indium, tin, tantalum, tungsten, rhenium, or thallium, wherein x satisfies $0 \leq x \leq 8$, y satisfies $0 \leq y \leq 8$, and z satisfies $0 \leq z \leq 50$, and wherein at least one of the x or the y is greater than 0;

$$H_p A_g(BD_{12}O_{40}) \cdot zH_2O \quad (3),$$

wherein p satisfies $0 \leq p \leq 4$, q satisfies $0 \leq q \leq 4$, and wherein at least one of the p or the q is greater than 0;

$$H_x A_y(B_2 D_{18}O_{62}) \cdot zH_2O \quad (4); \text{ and}$$

$$H_j A_k(B_5 D_{30}O_{110}) \cdot zH_2O \quad (5),$$

wherein j satisfies $0 \leq j \leq 15$, k satisfies $0 \leq k \leq 15$, and wherein at least one of the j or the k is greater than 0.

15. The lithium secondary battery according to claim 10, wherein the heteropoly acid is at least one of phosphomolybdic acid, phosphotungstic acid, silicomolybdic acid, or silicotungstic acid.

16. A positive electrode active material, comprising:
an element M2 incorporated in a crystal structure in a surface layer area of a complex oxide,
wherein the element M2 is carbon,
wherein the complex oxide comprises an element M1 and is represented by formula (1):

$$Li_{1+a}(Mn_b Co_c Ni_{1-b-c})_{1-a} M1_d O_{2-e} \quad (1),$$

wherein the element M1 is at least one of aluminum, magnesium, zirconium, titanium, barium, boron, silicon, or iron, and wherein a satisfies $0 < a < 0.25$, b satisfies $0.5 \leq b < 0.7$, c satisfies $0 \leq c < 1-b$, d satisfies $0.01 \leq d \leq 0.2$, and e satisfies $0 \leq e \leq 1$.

17. A positive electrode, comprising:
a positive electrode active material that comprises an element M2 incorporated in a crystal structure in a surface layer area of a complex oxide,
wherein the element M2 is carbon,
wherein the complex oxide comprises an element M1 and is represented by formula (1):

$$Li_{1+a}(Mn_b Co_c Ni_{1-b-c})_{1-a} M1_d O_{2-e} \quad (1),$$

wherein the element M1 is at least one of aluminum, magnesium, zirconium, titanium, barium, boron, silicon, or iron, and wherein a satisfies $0 < a < 0.25$, b satisfies $0.5 \leq b < 0.7$, c satisfies $0 \leq c < 1-b$, d satisfies $0.01 \leq d \leq 2$, and e satisfies $0 \leq e \leq 1$.

18. An electric tool, comprising:
a lithium secondary battery to supply power to the electric tool,
wherein the lithium secondary battery comprises a positive electrode, a negative electrode, and an electrolyte solution,
wherein the positive electrode comprises a positive electrode active material that comprises an element M2 incorporated in a crystal structure in a surface layer area of a complex oxide,
wherein the element M2 is carbon,
wherein the complex oxide comprises an element M1 and is represented by formula (1):

$$Li_{1+a}(Mn_b Co_c Ni_{1-b-c})_{1-a} M1_d O_{2-e} \quad (1),$$

wherein the element M1 is at least one of aluminum, magnesium, zirconium, titanium, barium, boron, silicon, or iron, and wherein a satisfies $0 < a < 0.25$, b satisfies $0.5 \leq b < 0.7$, c satisfies $0 \leq c < 1-b$, d satisfies $0.01 \leq d \leq 2$, and e satisfies $0 \leq e \leq 1$.

19. A power storage system, comprising:
a lithium secondary battery as a power storage source,
wherein the lithium secondary battery comprises a positive electrode, a negative electrode, and an electrolyte solution,
wherein the positive electrode comprises a positive electrode active material that comprises an element M2 incorporated in a crystal structure in a surface layer area of a complex oxide,
wherein the element M2 is carbon,
wherein the complex oxide comprises an element M1 and is represented by formula (1):

$$Li_{1+a}(Mn_b Co_c Ni_{1-b-c})_{1-a} M1_d O_{2-e} \quad (1),$$

wherein the element M1 is at least one of aluminum, magnesium, zirconium, titanium, barium, boron, silicon, or iron, and wherein a satisfies $0 < a < 0.25$, b satisfies $0.5 \leq b < 0.7$, c satisfies $0 \leq c < 1-b$, d satisfies $0.01 \leq d \leq 0.2$, and e satisfies $0 \leq e \leq 1$.

* * * * *